United States Patent
Kawamoto

(10) Patent No.: US 10,650,083 B2
(45) Date of Patent: May 12, 2020

(54) INFORMATION PROCESSING DEVICE, INFORMATION PROCESSING SYSTEM, AND INFORMATION PROCESSING METHOD TO DETERMINE CORRELATION OF DATA

(71) Applicant: SONY CORPORATION, Tokyo (JP)

(72) Inventor: Yohei Kawamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/065,959

(22) PCT Filed: Nov. 28, 2016

(86) PCT No.: PCT/JP2016/085116
§ 371 (c)(1),
(2) Date: Jun. 25, 2018

(87) PCT Pub. No.: WO2017/122437
PCT Pub. Date: Jul. 20, 2017

(65) Prior Publication Data
US 2019/0004999 A1 Jan. 3, 2019

(30) Foreign Application Priority Data
Jan. 12, 2016 (JP) .................. 2016-003803

(51) Int. Cl.
*G06F 17/16* (2006.01)
*G06Q 30/06* (2012.01)
(Continued)

(52) U.S. Cl.
CPC .............. *G06F 17/16* (2013.01); *G06F 16/00* (2019.01); *G06F 17/15* (2013.01);
(Continued)

(58) Field of Classification Search
None
See application file for complete search history.

(56) References Cited

U.S. PATENT DOCUMENTS

| 9,092,732 B1 | 7/2015 | Faratin et al. |
| 2007/0016528 A1 | 1/2007 | Verhaegh et al. |

(Continued)

FOREIGN PATENT DOCUMENTS

| CN | 104919458 A | 9/2015 |
| EP | 1654697 A1 | 5/2006 |

(Continued)

OTHER PUBLICATIONS

Zhang et al; "Binary and Multi Class Group Sparse Canonical Correlation Analysis for Feature Extraction and Classification;" pp. 2192-2205; vol. 25, No. 10, Oct. 2013 (Year: 2013).*

(Continued)

*Primary Examiner* — Michael D. Yaary
(74) *Attorney, Agent, or Firm* — Chip Law Group

(57) ABSTRACT

To perform high-speed and efficient processing of determining a correlation between vectors. An information processing system includes: a first information processing device having k number of vectors including secure data as an element; and a second information processing device having m number of vectors including secure data as an element. The first information processing device receives vector information regarding a vector Y selected from the m number of vectors, as encrypted data, from the second information processing device. A data processing unit of the first information processing device sequentially calculates element-based sample identifiers each having a specific common value for each of a plurality of different vectors Y selected from the m number of vectors to one vector X selected from the k number of vectors retained by the first information processing device, and sequentially determines (Continued)

the correlation between the one vector X and each of the plurality of different vectors.

14 Claims, 18 Drawing Sheets

(51) Int. Cl.
 *G06F 16/00* (2019.01)
 *G06Q 30/02* (2012.01)
 *G06F 21/62* (2013.01)
 *H04L 9/00* (2006.01)
 *G06F 17/15* (2006.01)
(52) U.S. Cl.
 CPC ......... *G06F 21/6245* (2013.01); *G06Q 30/02* (2013.01); *G06Q 30/0631* (2013.01); *H04L 9/008* (2013.01); *H04L 2209/46* (2013.01); *H04L 2209/60* (2013.01)

(56) References Cited

U.S. PATENT DOCUMENTS

| 2015/0161398 A1 | 6/2015 | De Cristofaro et al. |
| 2015/0278547 A1 | 10/2015 | Kawamoto et al. |
| 2015/0356152 A1 | 12/2015 | Tsuchida et al. |

FOREIGN PATENT DOCUMENTS

| JP | 2007-501975 A | 2/2007 |
| JP | 2008-521025 A | 6/2008 |
| JP | 2010-092432 A | 4/2010 |
| JP | 2014-206696 A | 10/2014 |
| JP | 2015-108807 A | 6/2015 |
| JP | 2015-194959 A | 11/2015 |
| JP | 6229665 B2 | 11/2017 |
| WO | 2005/015462 A1 | 2/2005 |
| WO | 2014/109388 A1 | 7/2014 |

OTHER PUBLICATIONS

Tinghai, Yue; "The Characterizations of Binary Vector-Output Plateaued Functions;" 2010 IEEE International Conference on Wireless Communications, Networking and Information Security (Year: 2010).*
Extended European Search Report of EP Patent Application No. 16885040.2, dated Dec. 13, 2018, 09 pages.
Egert, et al., "Privately Computing Set-Union and Set-Intersection Cardinality via Bloom Filters", 2015, 18 pages.
International Search Report and Written Opinion of PCT Application No. PCT/JP2016/085116, dated Jan. 10, 2017, 09 pages of ISRWO.
Egert, et al., "Privately Computing Set-Union and Set-Intersection Cardinality via Bloom Filters", 18 pages.
Office Action for JP Patent Application No. 2017-561533, dated Mar. 10, 2020, 09 pages of Office Action and 10 pages of English Translation.
Takeshi Shimoyama, "Data Processing without Decrypting Cipher", Information Processing Society of Japan, vol. 57, No. 1, Dec. 15, 2015, pp. 44-55.
Yasuda, et al., "Secret Totalization of Purchase histories of Companies in Cloud", Proceedings of the 22th Symposium on Cryptography and Information Security, Jan. 30-Feb. 2, 2012, 12 pages.

* cited by examiner

FIG. 1

| SAMPLE ID(t) (USER ID) | [ PIECES OF MERCHANDISE 1 TO k (item: $I_1$ TO $I_k$) ] | | | | |
|---|---|---|---|---|---|
| | MERCHANDISE 1 ($I_1$) | MERCHANDISE 2 ($I_2$) | MERCHANDISE 3 ($I_3$) | ... | MERCHANDISE k ($I_k$) |
| 1 | 1 | 1 | 0 | ... | 1 |
| 2 | 1 | 0 | 0 | ... | 1 |
| 3 | 1 | 0 | 0 | ... | 1 |
| 4 | 0 | 1 | 1 | ... | 0 |
| 5 | 1 | 0 | 0 | ... | 0 |
| .. | .. | .. | .. | .. | .. |
| n | 1 | 1 | 0 | ... | 1 |

FIG. 2A    RETAINED DATA OF COMPANY 1

[PIECES OF MERCHANDISE 1,1 TO 1,k (Item: $I_{1,1}$ TO $I_{1,k}$)]

| SAMPLE ID(i) (USER ID) | MERCHANDISE 1,1 ($I_{1,1}$) | MERCHANDISE 1,2 ($I_{1,2}$) | MERCHANDISE 1,3 ($I_{1,3}$) | ... | MERCHANDISE 1,k ($I_{1,k}$) |
|---|---|---|---|---|---|
| 1 | 1 | 1 | 0 | ... | 1 |
| 2 | 1 | 0 | 0 | ... | 1 |
| 3 | 1 | 0 | 0 | ... | 1 |
| 4 | 0 | 1 | 1 | ... | 0 |
| 5 | 1 | 0 | 0 | ... | 0 |
| .. | .. | .. | .. | .. | .. |
| n | 1 | 1 | 0 | ... | 1 |

FIG. 2B    RETAINED DATA OF COMPANY 2

[PIECES OF MERCHANDISE 2,1 TO 2,m (Item: $I_{2,1}$ TO $I_{2,m}$)]

| SAMPLE ID(i) (USER ID) | MERCHANDISE 2,1 ($I_{2,1}$) | MERCHANDISE 2,2 ($I_{2,2}$) | MERCHANDISE 2,3 ($I_{2,3}$) | ... | MERCHANDISE 2,m ($I_{2,m}$) |
|---|---|---|---|---|---|
| 1 | 0 | 1 | 1 | ... | 0 |
| 2 | 1 | 1 | 0 | ... | 1 |
| 3 | 0 | 0 | 1 | ... | 0 |
| 4 | 0 | 1 | 1 | ... | 0 |
| 5 | 1 | 0 | 1 | ... | 0 |
| .. | .. | .. | .. | .. | .. |
| n | 0 | 1 | 1 | ... | 0 |

FIG. 3A RETAINED DATA OF COMPANY 3

[BROADCAST PROGRAMS 3,1 TO 3,k (Item: $I_{3,1}$ TO $I_{3,k}$)]

| SAMPLE ID(t) (USER ID) | BROADCAST PROGRAM 3,1 ($I_{3,1}$) | BROADCAST PROGRAM 3,2 ($I_{3,2}$) | BROADCAST PROGRAM 3,3 ($I_{3,3}$) | ... | BROADCAST PROGRAM 3,k ($I_{3,k}$) |
|---|---|---|---|---|---|
| 1 | 0 | 1 | 1 | ... | 1 |
| 2 | 1 | 0 | 1 | ... | 1 |
| 3 | 0 | 0 | 1 | ... | 1 |
| 4 | 0 | 1 | 1 | ... | 1 |
| 5 | 1 | 1 | 0 | ... | 0 |
| ... | ... | ... | ... | ... | ... |
| n | 1 | 0 | 0 | ... | 1 |

FIG. 3B RETAINED DATA OF COMPANY 4

[PIECES OF MERCHANDISE 4,1 TO 4,m (Item: $I_{4,1}$ TO $I_{4,m}$)]

| SAMPLE ID(t) (USER ID) | MERCHANDISE 4,1 ($I_{4,1}$) | MERCHANDISE 4,2 ($I_{4,2}$) | MERCHANDISE 4,3 ($I_{4,3}$) | ... | MERCHANDISE 4,m ($I_{4,m}$) |
|---|---|---|---|---|---|
| 1 | 0 | 0 | 1 | ... | 0 |
| 2 | 1 | 1 | 0 | ... | 1 |
| 3 | 1 | 0 | 1 | ... | 0 |
| 4 | 0 | 1 | 0 | ... | 0 |
| 5 | 0 | 0 | 1 | ... | 1 |
| ... | ... | ... | ... | ... | ... |
| n | 0 | 1 | 0 | ... | 1 |

FIG. 4

[ PIECES OF MERCHANDISE 1 TO k(Item:$I_1$ TO $I_k$) ]

| SAMPLE ID(t) (USER ID) | MERCHANDISE 1($I_1$) | MERCHANDISE 2($I_2$) | MERCHANDISE 3($I_3$) | ... | MERCHANDISE k($I_k$) |
|---|---|---|---|---|---|
| 1 | 1 | 1 | 0 | ... | 1 |
| 2 | 1 | 0 | 0 | ... | 1 |
| 3 | 1 | 0 | 0 | ... | 1 |
| 4 | 0 | 1 | 1 | ... | 0 |
| 5 | 1 | 0 | 0 | ... | 0 |
| .. | .. | .. | .. | ... | .. |
| n | 1 | 1 | 0 | ... | 1 |

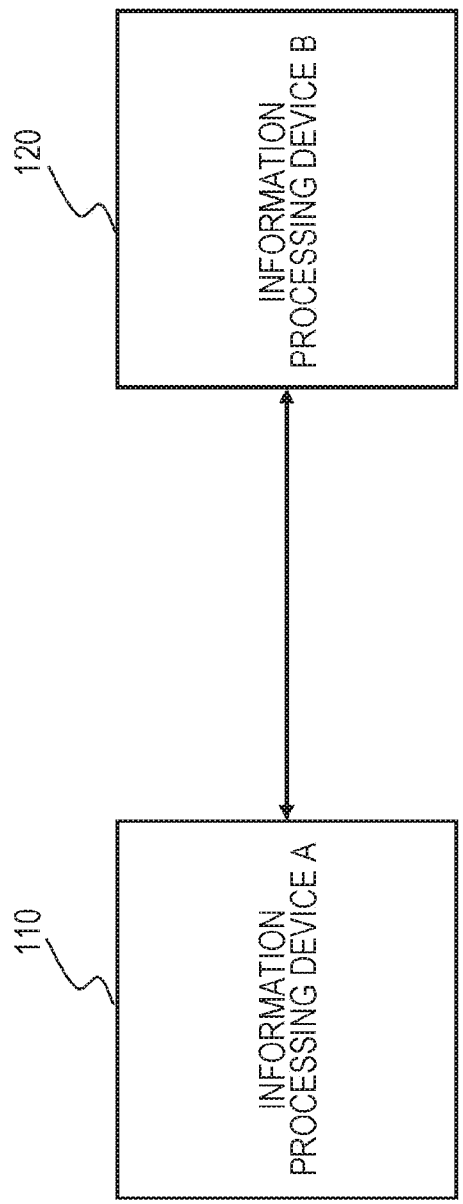

FIG. 8B

RETAINED DATA IN INFORMATION PROCESSING DEVICE B OF COMPANY 2

| SAMPLE ID (USER) | [PIECES OF MERCHANDISE 2,1 TO 2,m (Item: $I_{2,1}$ TO $I_{2,m}$)] ||||||
|---|---|---|---|---|---|---|
| | MERCHANDISE 2,1 ($I_{2,1}$) | MERCHANDISE 2,2 ($I_{2,2}$) | MERCHANDISE 2,3 ($I_{2,3}$) | ... | MERCHANDISE 2,m ($I_{2,m}$) |
| 1 | 0 | 1 | 1 | ... | 0 |
| 2 | 1 | 1 | 0 | ... | 1 |
| 3 | 0 | 0 | 1 | ... | 0 |
| 4 | 0 | 1 | 1 | ... | 0 |
| 5 | 1 | 0 | 1 | ... | 0 |
| ... | ... | ... | ... | ... | ... |
| n | 0 | 1 | 1 | ... | 0 |

FIG. 8A

RETAINED DATA IN INFORMATION PROCESSING DEVICE A OF COMPANY 1

| SAMPLE ID (USER) | [PIECES OF MERCHANDISE 1,1 TO 1,k (Item: $I_{1,1}$ TO $I_{1,k}$)] ||||||
|---|---|---|---|---|---|---|
| | MERCHANDISE 1,1 ($I_{1,1}$) | MERCHANDISE 1,2 ($I_{1,2}$) | MERCHANDISE 1,3 ($I_{1,3}$) | ... | MERCHANDISE 1,k ($I_{1,k}$) |
| 1 | 1 | 1 | 0 | ... | 1 |
| 2 | 1 | 0 | 0 | ... | 1 |
| 3 | 1 | 0 | 0 | ... | 1 |
| 4 | 0 | 1 | 1 | ... | 0 |
| 5 | 1 | 0 | 0 | ... | 0 |
| ... | ... | ... | ... | ... | ... |
| n | 1 | 1 | 0 | ... | 1 |

FIG. 9

JACCARD (Jaccard) SIMILARITY COEFFICIENT (1) $J_{ij} = \dfrac{x_i^T \cdot x_j}{|x_i| + |x_j| - x_i^T \cdot x_j}$ $(1 \leq i < j \leq k)$ (2) $J_{ij} = \dfrac{x_i^T \cdot y_j}{|x_i| + |y_j| - x_i^T \cdot y_j}$ $(1 \leq i \leq k, 1 \leq j \leq m)$ (3) $J_{ij} = \dfrac{y_i^T \cdot y_j}{|y_i| + |y_j| - y_i^T \cdot y_j}$ $(1 \leq i < j \leq m)$

FIG. 10A

RETAINED DATA IN INFORMATION PROCESSING DEVICE A OF COMPANY 1

| SAMPLE ID (USER) (t) | [MERCHANDISE: $I_1$ TO $I_k$] | | | | |
|---|---|---|---|---|---|
| | MERCHANDISE I_1 ($I_1$) | MERCHANDISE I_2 ($I_2$) | MERCHANDISE I_3 ($I_3$) | .. | MERCHANDISE I_k ($I_k$) |
| 1 | $x_1^1$ | $x_1^2$ | $x_1^3$ | ... | $x_1^k$ |
| 2 | $x_2^1$ | $x_2^2$ | $x_2^3$ | ... | $x_2^k$ |
| 3 | $x_3^1$ | $x_3^2$ | $x_3^3$ | ... | $x_3^k$ |
| 4 | $x_4^1$ | $x_4^2$ | $x_4^3$ | ... | $x_4^k$ |
| 5 | $x_5^1$ | $x_5^2$ | $x_5^3$ | ... | $x_5^k$ |
| .. | .. | .. | .. | .. | .. |
| n | $x_n^1$ | $x_n^2$ | $x_n^3$ | ... | $x_n^k$ |

FIG. 10B

RETAINED DATA IN INFORMATION PROCESSING DEVICE B OF COMPANY 2

| SAMPLE ID (USER) (t) | [MERCHANDISE: $J_1$ TO $J_m$] | | | | |
|---|---|---|---|---|---|
| | MERCHANDISE J_1 ($J_1$) | MERCHANDISE J_2 ($J_2$) | MERCHANDISE J_3 ($J_3$) | .. | MERCHANDISE J_m ($J_m$) |
| 1 | $y_1^1$ | $y_1^2$ | $y_1^3$ | ... | $y_1^m$ |
| 2 | $y_2^1$ | $y_2^2$ | $y_2^3$ | ... | $y_2^m$ |
| 3 | $y_3^1$ | $y_3^2$ | $y_3^3$ | ... | $y_3^m$ |
| 4 | $y_4^1$ | $y_4^2$ | $y_4^3$ | ... | $y_4^m$ |
| 5 | $y_5^1$ | $y_5^2$ | $y_5^3$ | ... | $y_5^m$ |
| .. | .. | .. | .. | .. | .. |
| n | $y_n^1$ | $y_n^2$ | $y_n^3$ | ... | $y_n^m$ |

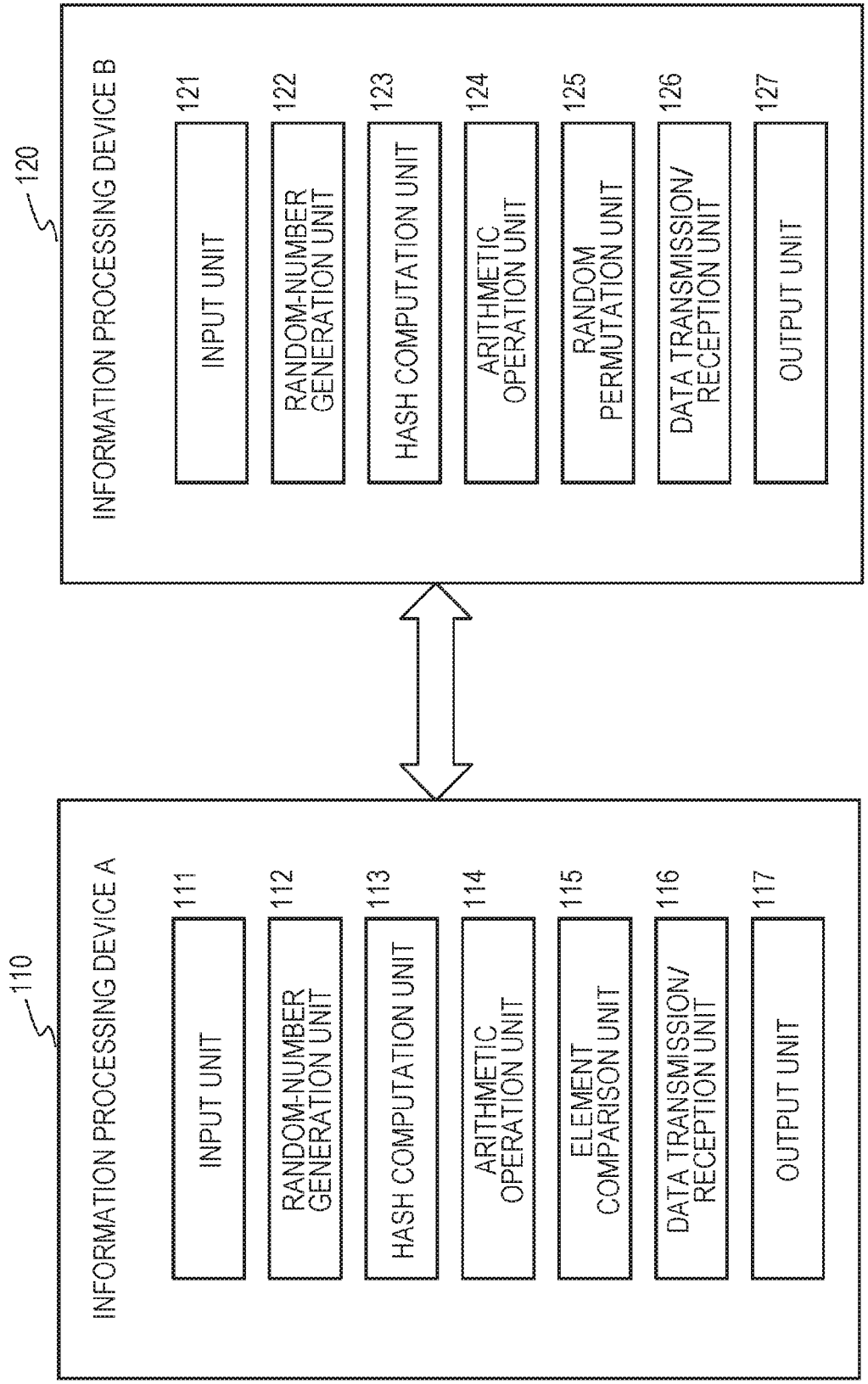

FIG. 13

| | INFORMATION PROCESSING DEVICE A | INFORMATION PROCESSING DEVICE B |
|---|---|---|
| INPUT | $C_i = \{c_1^i, ..., c_{v_i}^i\}\ (1 \leq i \leq k)$ | $S_j = \{s_1^j, ..., s_{w_j}^j\}\ (1 \leq j \leq m)$ |
| OUTPUT | $n_{i,j} = \|\{c_1^i, ..., c_{v_i}^i\} \cap \{s_1^j, ..., s_{w_j}^j\}\|$ $(1 \leq i \leq k, 1 \leq j \leq m)$ | $n_{i,j} = \|\{c_1^i, ..., c_{v_i}^i\} \cap \{s_1^j, ..., s_{w_j}^j\}\|$ $(1 \leq i \leq k, 1 \leq j \leq m)$ |

FIG. 14A

RETAINED DATA IN INFORMATION PROCESSING DEVICE A OF COMPANY 1

[MERCHANDISE: $I_1$ TO $I_k$]

| SAMPLE ID (USER) ($t$) | MERCHANDISE $I\_1$ ($I_1$) | MERCHANDISE $I\_2$ ($I_2$) | MERCHANDISE $I\_3$ ($I_3$) | ... | MERCHANDISE $I\_k$ ($I_k$) |
|---|---|---|---|---|---|
| 1 | $x_1^1$ | $x_1^2$ | $x_1^3$ | ... | $x_1^k$ |
| 2 | $x_2^1$ | $x_2^2$ | $x_2^3$ | ... | $x_2^k$ |
| 3 | $x_3^1$ | $x_3^2$ | $x_3^3$ | ... | $x_3^k$ |
| 4 | $x_4^1$ | $x_4^2$ | $x_4^3$ | ... | $x_4^k$ |
| 5 | $x_5^1$ | $x_5^2$ | $x_5^3$ | ... | $x_5^k$ |
| .. | .. | .. | .. | .. | .. |
| n | $x_n^1$ | $x_n^2$ | $x_n^3$ | ... | $x_n^k$ |

FIG. 14B

RETAINED DATA IN INFORMATION PROCESSING DEVICE B OF COMPANY 2

[MERCHANDISE: $J_1$ TO $J_m$]

| SAMPLE ID (USER) ($t$) | MERCHANDISE $J\_1$ ($J_1$) | MERCHANDISE $J\_2$ ($J_2$) | MERCHANDISE $J\_3$ ($J_3$) | ... | MERCHANDISE $J\_m$ ($J_m$) |
|---|---|---|---|---|---|
| 1 | $y_1^1$ | $y_1^2$ | $y_1^3$ | ... | $y_1^m$ |
| 2 | $y_2^1$ | $y_2^2$ | $y_2^3$ | ... | $y_2^m$ |
| 3 | $y_3^1$ | $y_3^2$ | $y_3^3$ | ... | $y_3^m$ |
| 4 | $y_4^1$ | $y_4^2$ | $y_4^3$ | ... | $y_4^m$ |
| 5 | $y_5^1$ | $y_5^2$ | $y_5^3$ | ... | $y_5^m$ |
| .. | .. | .. | .. | .. | .. |
| n | $y_n^1$ | $y_n^2$ | $y_n^3$ | ... | $y_n^m$ |

FIG. 17

| | INFORMATION PROCESSING DEVICE A | INFORMATION PROCESSING DEVICE B |
|---|---|---|
| INPUT | $C = \{c_1, ..., c_{v_i}\}$ | $S_j = \{s_1^j, ..., s_{w_j}^j\} (1 \leq j \leq m)$ |
| OUTPUT | $n_j = |\{c_1, ..., c_v\} \cap \{s_1^j, ..., s_{w_j}^j\}|$ $(1 \leq j \leq m)$ | $n_j = |\{c_1, ..., c_v\} \cap \{s_1^j, ..., s_{w_j}^j\}|$ $(1 \leq j \leq m)$ |

INFORMATION PROCESSING DEVICE, INFORMATION PROCESSING SYSTEM, AND INFORMATION PROCESSING METHOD TO DETERMINE CORRELATION OF DATA

CROSS REFERENCE TO RELATED APPLICATIONS

This application is a U.S. National Phase of International Patent Application No. PCT/JP2016/085116 filed on Nov. 28, 2016 which claims priority benefit of Japanese Patent Application No. JP 2016-003803 filed in the Japan Patent Office Jan. 12, 2016. Each of the above-referenced applications is hereby incorporated herein by reference in its entirety.

TECHNICAL FIELD

The present disclosure relates to an information processing device, an information processing system, and an information processing method, and a program. More particularly, the present disclosure relates to an information processing device, an information processing system, and an information processing method that estimate the association of data, such as the correlation or similarity between a plurality of different pieces of secure data, without disclosing the plurality of different pieces of secure data subject to restriction of release, and a program.

BACKGROUND ART

In recent years, merchandise sales have been actively promoted through a network, such as the Internet, and thus many users purchase various types of merchandise with smartphones or PCs.

Meanwhile, an Internet distributor has amassed merchandise-purchase history data indicating what sorts of users have purchased what types of merchandise.

The Internet distributor can perform processing of providing specific users with mail recommending specific merchandise or advertising for the specific merchandise on the basis of the amassed data, to promote the purchase of merchandise.

The Internet distributor retains, for example, data including a user ID being identification information regarding a user who has purchased merchandise, associated with identification information regarding the merchandise purchased by the user (merchandise ID). Furthermore, processing of acquiring and analyzing user profile data including, for example, the gender, age, and residence of the user may be performed.

However, such user merchandise-purchase history data includes personal information regarding each user, and thus is undesirable to release. That is, the user merchandise purchase history data is secure data subject to restriction of release, and thus is typically not allowed to be provided to another person without consent of each user.

However, there is a trend toward practically using respective different pieces of individually amassed secure data retained by many different Internet distributors, in cooperation with, for example, user ID or merchandise ID among different companies.

That is, there is a trend toward integrating and analyzing, for example, respective customer profiles and purchase histories individually amassed by the companies to use analyzed data for merchandise sales promotion, such as user targeted advertising.

Integration and analysis of respective individual databases retained by the companies enable merchandise sales or advertising provision to be more effective.

Furthermore, an attempt has been made to provide each-user-oriented optimum advertising or information, with integration of, for example, browsing history information regarding various advertisements and broadcast-program viewing history information in addition to the user merchandise-purchase history information.

However, as described above, the data retained by each company is often the secure data subject to restriction of release, such as the user merchandise-purchase history information, and thus there is a problem that the respective pieces of secure data retained by the companies are difficult to allow to be mutually provided and analyzed.

In recent years, various types of study have been made for a technology of analyzing the association between data, such as the correlation or similarity between secure data, without disclosing the secure data mutually, as a technology to solve the problem.

For example, there is provided a technique of analyzing the association between secure data with concealed data, such as encrypted data or converted data of the secure data.

Note that computation processing to be performed with the concealed data of the original data such as the encrypted data or converted data of the secure data is referred to as secret computation or secure computation.

For example, Patent Document 1 (JP 2008-521025 A) discloses a configuration of acquiring an indicator of the similarity between two pieces of data, with secure computation. Specifically, a configuration of the inner product of the two pieces of data with the secure computation to calculate the Hamming distance between the two pieces of data, as an index value in similarity, has been disclosed.

The present document discloses, as a specific inner-product calculation method with the secure computation, a method of encrypting input data with application of homomorphic encryption and performing homomorphic addition or multiplication to the encrypted data.

However, because it takes time for the homomorphic encryption being public key cryptography to encrypt the data, treatment of an enormous amount of data increases in computational complexity, and thus there is a problem that a computation device increases in load or in processing time. In addition, a cryptogram itself is large in size, and thus there is a problem that the traffic increases.

Furthermore, Patent Document 2 (JP 2014-206696 A) discloses a configuration of calculating, in a case where a plurality of organizations retains two different pieces of secure data to be concealed in the organizations, the inner product of the two pieces of secure data in a small amount of computational complexity.

The configuration disclosed in Patent Document 2 achieves a reduction in time in data concealment processing or the inner-product computation applied with concealed data.

However, the disclosed technique needs three independent computing machines that perform secure computation, and thus there is a problem that upsizing of a computational resource and high cost are inevitable.

CITATION LIST

Patent Documents

Patent Document 1: JP 2008-521025 A
Patent Document 2: JP 2014-206696 A

SUMMARY OF THE INVENTION

Problems to be Solved by the Invention

The present disclosure has been made in consideration of the problems, for example, and an object of the present disclosure is to provide an information processing device, an information processing system, and an information processing method that are capable of calculating, without mutually disclosing a plurality of different pieces of secure data not allowed to be disclosed, the relationship such as a correlation, between the pieces of secure data, and a program.

Furthermore, an object of one embodiment of the present disclosure is to provide an information processing device, an information processing system, and an information processing method that are capable of calculating, without disclosing a plurality of different pieces of secure data, the inner product between the pieces of secure data, and a program.

Solutions to Problems

A first aspect of the present disclosure is an information processing device including: a data processing unit configured to determine a correlation between one vector X selected from k number of vectors and one vector Y selected from m number of vectors. The data processing unit calculates the number of element-based sample identifiers each having a specific common value, from the vector X and the vector Y, in accordance with secure computation, and performs processing of determining the correlation between the vectors, corresponding to the number calculated. The data processing unit sequentially calculates the element-based sample identifiers each having the specific common value for each of a plurality of the different vectors Y selected from the m number of vectors to the one vector X, and sequentially determines the correlation between the one vector X and each of the plurality of the different vectors.

Furthermore, a second aspect of the present disclosure is an information processing system including: a first information processing device having k number of vectors including secure data as an element; and a second information processing device having m number of vectors including secure data as an element. The first information processing device receives vector information regarding a vector Y selected from the m number of vectors, as encrypted data, from the second information processing device. A data processing unit of the first information processing device calculates the number of element-based sample identifiers each having a specific common value, from one vector X selected from the k number of vectors retained by the first information processing device and the vector Y, in accordance with secure computation, and performs processing of determining a correlation between the vectors, corresponding to the number calculated. The data processing unit sequentially calculates the element-based sample identifiers each having the specific common value for each of a plurality of the different vectors Y selected from the m number of vectors to the one vector X, and sequentially determines the correlation between the one vector X and each of the plurality of the different vectors.

Furthermore, a third aspect of the present disclosure is an information processing method to be performed in an information processing device including: a data processing unit configured to determine a correlation between one vector X selected from k number of vectors and one vector Y selected from m number of vectors, the information processing method including: calculating the number of element-based sample identifiers each having a specific common value, from the vector X and the vector Y, in accordance with secure computation and performing processing of determining the correlation between the vectors, corresponding to the number calculated, with the data processing unit; and sequentially calculating the element-based sample identifiers each having the specific common value for each of a plurality of the different vectors Y selected from the m number of vectors to the one vector X and sequentially determining the correlation between the one vector X and each of the plurality of the different vectors, with the data processing unit.

Furthermore, a fourth aspect of the present disclosure is an information processing method to be performed in an information processing system including: a first information processing device having k number of vectors including secure data as an element; and a second information processing device having m number of vectors including secure data as an element, the information processing method including: receiving vector information regarding a vector Y selected from the m number of vectors, as encrypted data, from the second information processing device, with the first information processing device; calculating the number of element-based sample identifiers each having a specific common value, from one vector X selected from the k number of vectors retained by the first information processing device and the vector Y, in accordance with secure computation and performing processing of determining a correlation between the vectors, corresponding to the number calculated, with a data processing unit of the first information processing device; and sequentially calculating the element-based sample identifiers each having the specific common value for each of a plurality of the different vectors Y selected from the m number of vectors to the one vector X and sequentially determining the correlation between the one vector X and each of the plurality of the different vectors, with the data processing unit.

Furthermore, a fifth aspect of the present disclosure is a program for causing information processing to be performed in an information processing device including a data processing unit configured to determine a correlation between one vector X selected from k number of vectors and one vector Y selected from m number of vectors, the program causing the data processing unit to execute: calculating the number of element-based sample identifiers each having a specific common value, from the vector X and the vector Y, in accordance with secure computation and performing processing of determining the correlation between the vectors, corresponding to the number calculated; and further sequentially calculating the element-based sample identifiers each having the specific common value for each of a plurality of the different vectors Y selected from the m number of vectors to the one vector X and sequentially determining the correlation between the one vector X and each of the plurality of the different vectors.

Note that the program according to the present disclosure is provided to, for example, an information processing device or a computer system capable of executing various program codes, through a storage medium, for example. Execution of the program by a program execution unit on the information processing device or the computer system allows processing corresponding to the program to be achieved.

The features, the advantages, and another different object according to the present disclosure, will be clear with the embodiment to be described later according to the present invention and the more detailed descriptions based on the attached drawings. Note that a system in the present specification is a logical aggregate configuration including a plurality of devices, but is not limited to a configuration including the constituent devices in the same housing.

Effects of the Invention

The configuration according to one embodiment of the present disclosure allows high-speed and efficient processing of determining the correlation between vectors to be achieved.

Specifically, an information processing system includes: a first information processing device having k number of vectors including secure data as an element; and a second information processing device having m number of vectors including secure data as an element. The first information processing device receives vector information regarding a vector Y selected from the m number of vectors, as encrypted data, from the second information processing device. A data processing unit of the first information processing device sequentially calculates element-based sample identifiers each having a specific common value for each of a plurality of different vectors Y selected from the m number of vectors to one vector X selected from the k number of vectors retained by the first information processing device, and sequentially determines the correlation between the one vector X and each of the plurality of different vectors.

According to the present configuration, the high-speed and efficient processing of determining the correlation between vectors is achieved.

Note that the effects described in the present specification are, but are not limited to, just exemplifications, and thus additional effects may be provided.

BRIEF DESCRIPTION OF DRAWINGS

FIG. 1 is a table of exemplary user-based merchandise-purchase history data amassed by a company, retained in a storage unit as a database.

FIGS. 2A and 2B are tables of exemplary respective pieces of user-based merchandise-purchase history data individually amassed by a company 1 and a company 2.

FIGS. 3A and 3B are tables of exemplary respective pieces of user-based data individually amassed by a company 3 and a company 4.

FIG. 4 is a table of exemplary user-based merchandise-purchase history data amassed by a company, retained in a storage unit as a database.

FIG. 7 is a diagram of an exemplary configuration of one information processing system that performs processing according to the present disclosure.

FIGS. 8A and 8B are tables of exemplary respective pieces of secure data retained in storage units of two information processing devices A 110 and B 120.

FIG. 9 is a correspondence table of the Jaccard similarity coefficient being one index value indicating the association between the pieces of secure data retained by the two information processing devices A 110 and B 120.

FIGS. 10A and 10B are tables of the pieces of data retained by the information processing devices A 110 and B 120, the pieces of data corresponding to n number of users.

FIG. 11 is a diagram of partial configurations of the information processing devices A 110 and B 120 each retaining the secure data.

FIG. 13 is a table of respective input values and output values of the information processing devices A and B in the processing to be performed in accordance with the flow illustrated in FIG. 12.

FIGS. 14A and 14B are tables for describing an outline of processing of estimating the relationship between the secure data with batch PSI-CA.

FIG. 17 is a table of respective input values and output values of the information processing devices A and B in the processing to be performed in accordance with the flow illustrated in FIGS. 15 and 16.

MODE FOR CARRYING OUT THE INVENTION

Figure 5:
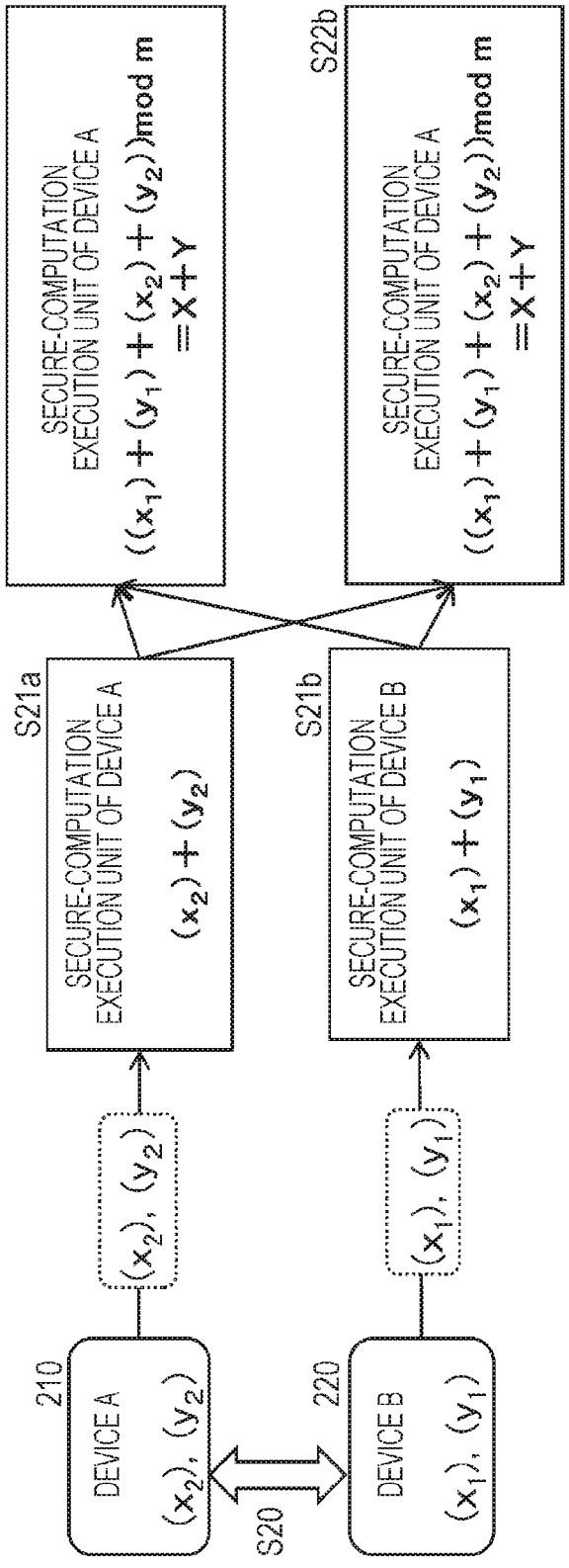
FIG. 5 is a diagram for describing exemplary processing of calculating an added result of secure data with secure computation.

An information processing device, an information processing system, and an information processing method, and a program according to the present disclosure will be described in detail below with reference to the drawings. The descriptions will be given in accordance with the following items.

1. Exemplary Configuration of System Capable of Adopting Processing according to Present Disclosure
2. Jaccard Similarity Coefficient
3. Outline of Secure Computation
4. Processing of Estimating Relationship between Secure Data with Secure Computation Reduced in Computational Complexity
4-a. Exemplary Setting in Precondition for Performance of Processing according to Present Disclosure
4-b. Outline of Processing of Achieving High-Speed Computation
4-c. Exemplary Processing of Calculating Relationship between Secure Data with Secure Computation Reduced in Computational Complexity
5. Batch Computation Processing Applied with Private Set Intersection Cardinality (PSI-CA) Protocol
5-1. (Description 1) Processing to be Performed by Information Processing Device A 110 (Steps S211 to S213)
5-2. (Description 2) Processing to be Performed by Information Processing Device B 120 (Steps S221 to S225)

5-3. (Description 3) Processing to be Performed by Information Processing Device A 110 (Steps S214 to S216)

5-4. (Description 4) Processing to be Performed by Information Processing Device B 120 Illustrated in FIG. 16 (Step S226)

6. Exemplary Hardware Configuration of Information Processing Device

7. Summary of Configuration of Present Disclosure

[1. Exemplary Configuration of System Capable of Adopting Processing according to Present Disclosure]

First, an exemplary configuration of a system capable of adopting processing according to the present disclosure will be described.

As described above, in recent years, merchandise sales have been actively promoted through a network, such as the Internet, and thus many users purchase various types of merchandise with smartphones or PCs.

Meanwhile, a company, such as an Internet distributor, has amassed merchandise-purchase history data indicating what sorts of users have purchased what types of merchandise, and retains the merchandise-purchase history data in a storage unit as a database.

The company can perform processing of providing specific users with mail recommending specific merchandise or advertising for the specific merchandise on the basis of the amassed data, to promote the purchase of merchandise.

FIG. 1 is a table of exemplary user-based merchandise-purchase history amassed by a company, retained in a storage unit as a database.

The data illustrated in FIG. 1 indicates what merchandise a sample identifier (t) (=users 1 to n) corresponding to each user ID has purchased from k pieces of merchandise 1 to k (item: I_1 to I_k).

Note that a subscript is indicated after an underscore (_) in the present specification.

For example, I_1 represents $I_1$ and I_k represents $I_k$.

The data illustrated in FIG. 1 includes merchandise-purchase history identification information set, the merchandise-purchase history identification information including:

[1] for presence of merchandise-purchase history; and

[0] for absence of merchandise-purchase history.

In this manner, the company, such as an Internet distributor, retains the data including a user ID associated with identification information regarding merchandise purchased by the user (merchandise ID).

Note that the data illustrated in FIG. 1 is exemplary, and thus, for example, user profile data including the gender, age, residence, and the like of the user, may be further acquired.

The user merchandise-purchase history data as illustrated in FIG. 1 includes personal information regarding each user, and thus is undesirable to release. That is, the user merchandise-purchase history data is secure data subject to restriction of release, and thus is typically not allowed to be provided to another person without consent of each user.

However, there is a trend toward practically using respective different pieces of individually amassed secure data retained by many different Internet distributors, in cooperation with, for example, user ID or merchandise ID among different companies.

That is, there is a trend toward integrating and analyzing, for example, respective customer profiles and purchase histories individually amassed by the companies to use analyzed data for further sales promotion.

FIGS. 2A and 2B illustrate respective pieces of user-based merchandise-purchase history data individually amassed by two different companies, for example, a company 1 and a company 2 being two different Internet distributors.

The data illustrated in FIG. 2A is the user-based merchandise-purchase history data amassed by the company 1, and indicates what merchandise users 1 to n each have purchased from pieces of merchandise 1, 1 to 1, k (item: I_(1, 1) to I_(1, k)) provided by the company 1.

The data illustrated in FIG. 2B is the user-based merchandise-purchase history data amassed by the company 2, and indicates what merchandise users 1 to n each have purchased from pieces of merchandise 2, 1 to 2, m (item: I_(2, 1) to I_(2, m)) provided by the company 2.

Similarly to that of FIG. 1, the data illustrated in FIGS. 2A and 2B includes merchandise-purchase history identification information set, the merchandise-purchase history identification information including:

[1] for presence of merchandise-purchase history; and

[0] for absence of merchandise-purchase history.

FIGS. 2A and 2B each illustrate merchandise-purchase history information for the same number of users: 1 to n.

x (x=1) indicated in I_(x, y) of each of the pieces of merchandise 1, 1 to 1, k (item: I_(1, 1) to I_(1, k)) illustrated in FIG. 2A represents an identifier of a company or an information processing device retaining the secure data, and y (y=1 to k) represents a merchandise identifier.

Similarly, x (x=2) indicated in I_(x, y) of each of the pieces of merchandise 2, 1 to 2, m (item: I_(2, 1) to I_(2, m)) illustrated in FIG. 2B(2) represents an identifier of a company or an information processing device retaining the secure data, and y (y=1 to m) represents a merchandise identifier.

The company 1 illustrated in FIG. 2A retains the purchase history information regarding k types of merchandise for n number of users, and the company 2 illustrated in FIG. 2B retains the purchase history information regarding m types of merchandise for the n number of users.

FIGS. 2A and 2B illustrate the respective pieces of user-based merchandise-purchase history data individually amassed by the two different companies, for example, the company 1 and the company 2 being the two different Internet distributors, and integration and analysis of respective individual databases retained by the companies enables merchandise sales or advertising provision to be more effective.

Furthermore, an attempt has been made to provide each-user-oriented optimum advertising or information, with integration of, for example, browsing history information regarding various advertisements and broadcast-program viewing history information in addition to the user merchandise-purchase history information.

FIGS. 3A and 3B illustrate respective pieces of data individually amassed by a broadcast-program providing company 3, such as a broadcasting station, and a company 4 being an Internet distributor.

The data illustrated in FIG. 3A is user-based broadcast-program viewing history data amassed by the company 3, such as the broadcasting station, and indicates which broadcast program users 1 to n each have viewed from broadcast programs 3, 1 to 3, k (item: I_(3, 1) to I_(3, k)) broadcasted by the company 3.

The data illustrated in FIG. 3B is user-based merchandise-purchase history data amassed by the company 4, and indicates what merchandise users 1 to n each have purchased from pieces of merchandise 4, 1 to 4, m (item: I_(4, 1) to I_(4, m)) provided by the company 4.

The data illustrated in FIGS. 3A and 3B includes history identification information set, the history identification information including:

[1] for presence of broadcast-program viewing history or for presence of merchandise-purchase history; and

[0] for absence of broadcast-program viewing history or for absence of merchandise-purchase history.

FIGS. 3A and 3B each illustrate broadcast-program viewing history information or merchandise-purchase history information for the same number of users: 1 to n.

x (x=3) indicated in I_(x, y) of each of the broadcast programs 3, 1 to 3, k (item: I_(3, 1) to I_(3, k)) illustrated in FIG. 3A represents an identifier of a company or an information processing device retaining the secure data, and y (y=1 to k) represents a broadcast-program identifier.

Similarly, x (x=4) indicated in I_(x, y) of each of the pieces of merchandise 4, 1 to 4, m (item: I_(4, 1) to I_(4, m)) illustrated in FIG. 3B represents an identifier of a company or an information processing device retaining the secure data, and y (y=1 to m) represents a merchandise identifier.

The company 3 illustrated in FIG. 3A retains the viewing history information regarding k types of broadcast programs for n number of users, and the company 4 illustrated in FIG. 3B retains the purchase history information regarding m types of merchandise for the n number of users.

In this manner, integration of, for example, browsing history information regarding various advertisements and broadcast-program viewing history information in addition to merchandise-purchase history information between merchandise distributors enables each-user-oriented optimum advertising or information, to be provided.

However, the data retained by each company is often the secure data subject to restriction of release, such as the user merchandise-purchase history information, and thus there is a problem that the respective pieces of secure data retained by the companies are difficult to allow to be mutually provided and analyzed.

[2. Jaccard Similarity Coefficient]

For example, if a user estimated as having a high tendency to purchase specific merchandise can be specified, providing the user with merchandise information regarding the merchandise or advertising for the merchandise, enables higher advertising effectiveness or sales promotion effectiveness to be acquired.

Specifically, for example, the following analytical data is effective in selecting a user who has a strong interest in purchasing specific merchandise:

(1) whether a user having purchased merchandise A has a high or low tendency to purchase different merchandise B, or (2) whether a user having viewed a broadcast program C has a high or low tendency to purchase merchandise D.

As an index value to be applied to such estimation processing, the Jaccard similarity coefficient has been known.

Exemplary processing of calculating the Jaccard similarity coefficient will be described below.

FIG. 4 illustrates exemplary user-based merchandise-purchase history data amassed by a company, such as an Internet distributor, on the basis of Internet sales performance data, the exemplary user-based merchandise-purchase history data being similar to that of FIG. 1, for example.

The data illustrated in FIG. 4 indicates what merchandise n number of users (users 1 to n) each have purchased from k pieces of merchandise 1 to k (item: I_1 to I_k).

The data illustrated in FIG. 4 includes merchandise-purchase history identification information set, the merchandise-purchase history identification information including:

[1] for presence of merchandise-purchase history; and

[0] for absence of merchandise-purchase history.

The Jaccard similarity coefficient is data available, for example, in determining whether a user having purchased merchandise has a strong interest in purchasing different merchandise, and the like.

In addition, the Jaccard similarity coefficient is also available, for example, in determining whether a user having viewed a broadcast program has a strong interest in purchasing specific merchandise, and the like.

Specifically, for example, the Jaccard similarity coefficient is used for processing of estimating the possibility that a user having purchased the merchandise I_p in the data illustrated in FIG. 4 purchases the different merchandise I_q in the data illustrated in FIG. 4, and the like.

In the data illustrated in FIG. 4, a vector indicating the users having purchased the merchandise I_p in the data illustrated in FIG. 4 and a vector indicating the users having purchased the merchandise I_q in the data illustrated in FIG. 4 are individually generated, and then the degree of similarity (amount of correlation) between the vectors is calculated.

If the degree of similarity (amount of correlation) between the vectors is high, it can be estimated that the user having purchased the merchandise I_p is highly likely to purchase the different merchandise I_q.

Meanwhile, in a case where the degree of similarity (amount of correlation) between the vectors is low, it can be estimated that the user having purchased the merchandise I_p is less likely to purchase the different merchandise I_q.

Exemplary specific processing of calculating the Jaccard similarity coefficient will be described.

For example, an n-dimensional vector (1, 1, 1, 0, 1, . . . , 1 corresponding to the number of users n, indicating the users having purchased the merchandise I_1 in the data illustrated in FIG. 4 and an n-dimensional vector (1, 0, 0, 1, 0, . . . , 1 corresponding to the number of users n, indicating the users having purchased the merchandise I_2 in the data illustrated in FIG. 4 are individually generated and then the degree of similarity (amount of correlation) between the vectors is calculated.

If the degree of similarity (amount of correlation) between the vectors is high, it can be estimated that a user having purchased the merchandise I_1 is highly likely to purchase the different merchandise I_2.

Meanwhile, in a case where the degree of similarity (amount of correlation) between the vectors is low, it can be estimated that the user having purchased the merchandise I_1 is less likely to purchase the different merchandise I_2.

An n-dimensional vector corresponding to the number of users n, indicating the users having purchased the merchandise I_i, is referred to as a purchase vector for the merchandise I_i. The purchase vector for the merchandise I_i can be expressed in (Expression 1) below.

[Math. 1]

$$x_i^T = (x_1^i, x_2^i, \ldots, x_n^i)(i=1, \ldots, k)$$  (Expression 1)

In (Expression 1) above, a matrix: $x^T\_i$ represents the transposed matrix of a matrix: x_i.

$x^i\_t$ indicated as an element of the matrix: $x^T\_i$ represents the purchase status of the item (merchandise) I_i of the user having the user ID=t.

In this case, the Jaccard similarity coefficient J_ij indicating the amount of inter-item correlation between the item (merchandise) I_i and the item (merchandise) I_j, is defined in (Expression 2) below.

[Math. 2]

$$J_{ij} = \frac{x_i^T \cdot x_j}{|x_i| + |x_j| - x_i^T \cdot x_j} \quad (1 \leq i < j \leq k) \quad \text{(Expression 2)}$$

Note that, $$x_i^T \cdot x_j = \sum_{t=1}^{n} x_t^i \cdot x_t^j \quad \text{(Expression 2a)}$$

$$|x_i| = \sum_{t=1}^{n} x_t^i \quad \text{(Expression 2b)}$$

Note that x_i and $x^T$_i in (Expression 2) above are matrices (n-dimensional vectors) expressed in (Expression 3a) and (Expression 3b) below, respectively.

[Math. 3]

$$x_i = \begin{pmatrix} x_1^j \\ x_2^j \\ \vdots \\ x_n^j \end{pmatrix} \quad (i = 1, \ldots, k) \quad \text{(Expression 3a)}$$

$$x_i^T = (x_1^j, x_2^j, \ldots, x_n^j) \quad (i = 1, \ldots, k) \quad \text{(Expression 3b)}$$

The Jaccard similarity coefficient defined in (Expression 2) above indicates the amount of correlation or the degree of similarity between different items, and is one of the amount of correlation to be used in inter-item collaborative filtering.

If the value of the Jaccard similarity coefficient: J_ij defined in (Expression 2) above is large, it is determined that the amount of inter-item correlation between the item (merchandise) I_i and the item (merchandise) I_j is large. That is, for example, it can be estimated that a user having purchased the item (merchandise) I_i is highly likely to purchase the item (merchandise) I_j.

Meanwhile, if the value of the Jaccard similarity coefficient: J_ij defined in (Expression 2) above is small, it is determined that the amount of inter-item correlation between the item (merchandise) I_i and the item (merchandise) I_j is small. That is, for example, it can be estimated that the user having purchased the item (merchandise) I_i is not necessarily highly likely to purchase the item (merchandise) I_j.

In this manner, the Jaccard similarity coefficient is used as the index value for determining the correlation between information regarding one item such as one piece of merchandise (e.g., user-based merchandise-purchase information) and information regarding a different item (e.g., user-based merchandise-purchase information).

Note that the value of the Jaccard similarity coefficient expressed in (Expression 2) above depends on the inner product of purchase status data ($x^i$_t) of the item (merchandise) I_i and purchase status data ($x^j$_t) of the item (merchandise) I_j, namely, the inner product between the purchase vectors, as expressed in (Expression 2a).

That is, calculation of the inner product of the purchase status data ($x^i$_t) of the item (merchandise) I_i and the purchase status data ($x^j$_t) of the item (merchandise) I_j (inner product between the purchase vectors) enables the inner product to be used as the correlation (similarity) index value between the items.

[3. Outline of Secure Computation]

The exemplary processing of calculating the Jaccard similarity coefficient described above is intended for a case where respective pieces of user-purchase status information regarding two pieces of merchandise to be calculated in correlation have been acquired.

That is, the Jaccard similarity coefficient can be calculated with (Expression 2) above in a case where two vectors of the purchase vector of the item (merchandise) I_i and the purchase vector of the item (merchandise) I_j illustrated in FIG. 4 have been acquired.

For example, the one company having acquired the merchandise-purchase history information illustrated in FIG. 4 calculates the Jaccard similarity coefficient with the merchandise-purchase history information illustrated in FIG. 4, so that the correlation of purchase status can be acquired between a plurality of pieces of merchandise.

However, information to be acquired with such limited data is limitative.

Many companies each retain, for example, individually amassed different merchandise-purchase history information or broadcast-program viewing history information.

Integration and analysis of respective individual databases retained by the companies enables merchandise sales or advertising provision to be more effective.

However, as described above, for example, the merchandise-purchase history information retained by each company, is often the secure data, such as personal data or sensitive data, subject to restriction of release, and thus there is a problem that the respective pieces of secure data retained by the companies are difficult to allow to be mutually provided and analyzed.

In addition, the companies each are in a state where the data is an asset having an economic value and is undesirable to supply to a different company.

Meanwhile, for example, there is a need for advertising provision for further merchandise sales promotion, with analysis of combined data among different companies.

However, the secure data, such as personal data or sensitive data, subject to restriction of release is not allowed to be provided mutually.

For example, as described earlier with reference to FIGS. 2A and 2B, in a case where the two different companies 1 and 2 each retain the individual merchandise-purchase history information, the company 1 is not allowed to acquire the data of the company 2, namely, the data illustrated in FIG. 2B. Similarly, the company 2 is not allowed to acquire the data of the company 1, namely, the data illustrated in FIG. 2B.

However, for example, there are not a few cases where the company 2 retaining the data illustrated in FIG. 2B(2) desires to acquire estimation information regarding whether a user having purchased the merchandise 1, 1 (I_(1, 1)) of the company 1 highly tends to purchase the merchandise 2, 1 (I_(2, 1)) of the company 2.

A configuration of calculating, in a case where two companies each individually retain secure data not allowed to be disclosed, such as merchandise-purchase history information or broadcast-program viewing history information, the index value indicating the correlation or similarity between the pieces of secure data, without disclosing the pieces of secure data mutually, will be described below.

Note that examples of the index value indicating the correlation or similarity between the pieces of secure data include the Jaccard similarity coefficient described above and the inner product between the purchase vectors.

For example, the merchandise-purchase history information retained by each company is the secure data, such as personal data or sensitive data, subject to restriction of release.

Secure computation has been known as processing of calculating, without disclosure of such secure data subject to restriction of release, an arithmetic result between the pieces of secure data, for example, the inner product between the purchase vectors and the like.

The secure computation is computation processing capable of acquiring various arithmetic results of the secure data, such as an added result and a multiplied result of the secure data, for example, with arithmetic with converted data generated on the basis of the secure data, without direct use of the secure data not allowed to be released.

The computation processing with the converted data of the secure data in this manner is referred to as the secure computation.

The converted data of the secure data is used instead of the secure data itself in the computation processing of the secure computation. Various types of data, such as encrypted data and segmented data of the secure data, different from the original secure data, are provided as the converted data, for example.

An example of the secure computation is a GMW scheme described in Non-Patent Document 1 (O. Goldreich, S. Micali, and A. Wigderson. How to play any mental game. STOC'87, pp. 218-229, 1987.).

An outline of secure computation processing based on the GMW scheme will be described with reference to FIGS. 5 and 6.

FIG. 5 is a diagram of exemplary processing of calculating an added value of secure data with the secure computation based on the GMW scheme.

A device A 210 retains secure data X (e.g., explanatory variable (x)).

In addition, a device B 220 retains secure data Y (e.g., outcome variable (y)).

The secure data X and the secure data Y are secure data, such as personal data, undesirable to release.

The device A 210 segments the secure data X into two pieces of data as below. Note that X is set as residual data of a predetermined numerical value m: mod m.

$$X=((x\_1)+(x\_2)) \mod m$$

In the above expression, $(x\_1)$ is selected from 0 to $(m-1)$ uniformly and randomly and $(x\_2)$ is determined to satisfy the following expression: $(x\_2)=(X-(x\_1)) \mod m$.

In this manner, the two pieces of segmented data $(x\_1)$ and $(x\_2)$ are generated.

Note that, here, the data to be segmented is, for example, the value (1) of gender of a sample (user) in the secure data illustrated in FIG. 1, and various different modes of segmented data can be set, for example, segmentation of the value (1) into (30) and (71) or into (45) and (56) for m=100.

The value (0) of gender can be subjected to processing such as segmentation into (40) and (60) as a segmented value.

Age (54) can be subjected to processing such as segmentation into (10) and (44) or can be subjected to other various types of segmentation processing.

An important thing is that the original secure data (explanatory variable) is prevented from being specified from individual converted data (here, one piece of segmented data).

For example, the segmented data is not released as a set, and, for example, only one piece of segmented data is released, namely, is provided to the other device.

Meanwhile, the device B 220 also segments the secure data Y into two pieces of data as below:

$$Y=((y\_1)+(y\_2)) \mod m.$$

In the above expression, $(y\_1)$ is selected from 0 to $(m-1)$ uniformly and randomly, and $(y\_2)$ is determined to satisfy the following expression: $(y\_2)=(Y-(y\_1)) \mod m$.

In this manner, the two pieces of segmented data $(y\_1)$ and $(y\_2)$ are generated.

As illustrated in FIG. 5, the device A 210 and the device B 220 each provide the other device with part of the segmented data, at step S20.

The device A 210 provides the device B 220 with the segmented data $(x\_1)$.

Meanwhile, the device B 220 provides the device A 210 with the segmented data $(y\_2)$.

X and Y each are the secure data, and thus are not allowed to leak.

However, even if only one piece of data of the pieces of segmented data $(x\_1)$ and $(x\_2)$ of X is acquired, the secure data X cannot be specified.

Similarly, even if only one piece of data of the pieces of segmented data $(y\_1)$ and $(y\_2)$ of Y is acquired, the secure data Y cannot be specified.

Therefore, only partial data of the segmented data of the secure data, is insufficient to specification of the secure data, and thus is allowed to be output outward.

In this manner, the device A 210 outputs the segmented data $(x\_1)$ to a computation-processing execution unit of the device B 220.

Meanwhile, the device B 220 outputs the segmented data $(y\_2)$ to a computation-processing execution unit of the device A 210.

(Step S21a)

At step S21a, the computation-processing execution unit of the device A 210 performs the following inter-segmented-data addition processing with the segmented data:

$$((x\_2)+(y\_2)) \mod m.$$

The device A 210 outputs an added result thereof to the computation-processing execution unit of the device B 220.

(Step S21b)

Meanwhile, at step S21b, the computation-processing execution unit of the device B 220 performs the following inter-segmented-data addition processing with the segmented data:

$$((x\_1)+(y\_1)) \mod m.$$

The device B 220 outputs an added result thereof to the computation-processing execution unit of the device A 210.

(Step S22a)

Next, at step S22a, the computation-processing execution unit of the device A 210 performs the following processing.

Two added results are further added, the two added results including: (1) the added result $(x\_2)+(y\_2)$ of the segmented data calculated at step S21a; and (2) the added result $(x\_1)+(y\_1)$ of the segmented data input from the device B 220.

That is, the following computation is performed.

$$((x\_1)+(y\_1)+(x\_2)+(y\_2)) \mod m$$

The total added value of the segmented data is equivalent to the added value of the original secure data X and secure data Y.

That is, the following expression is satisfied: $((x\_1)+(y\_1)+(x\_2)+(y\_2)) \bmod m = X+Y$.

(Step S22b)

Meanwhile, at step S22b, the computation-processing execution unit of the device B 220 performs the following processing.

Two added results are further added, the two added results including: (1) the added result $(x\_1)+(y\_1)$ of the segmented data calculated at step S21b; and (2) the added result $(x\_2)+(y\_2)$ of the segmented data input from the device A 210.

That is, the following computation is performed.

$$((x\_1)+(y\_1)+(x\_2)+(y\_2)) \bmod m$$

The total added value of the segmented data is equivalent to the added value of the original secure data X and secure data Y.

That is, the following expression is satisfied: $((x\_1)+(y\_1)+(x\_2)+(y\_2)) \bmod m = X+Y$.

In this manner, both the device A and the device B can calculate, without outputting the secure data X and the secure data Y outward, respectively, the added value of the secure data X and the secure data Y, namely, X+Y.

The processing illustrated in FIG. 5 is exemplary processing of calculating the added value of the secure data, applied with the secure computation based on the GMW scheme.

Note that the processing described with reference to FIG. 5 includes an outline of the processing of calculating the added value of the secure data X and the secure data Y, in a simple manner. For performance of practical addition processing or multiplication processing of the secure data, typically, the secure computation is required to be performed repeatedly, for example, application of a computed result acquired by first secure computation, to an input value of the next secure computation.

Figure 6:
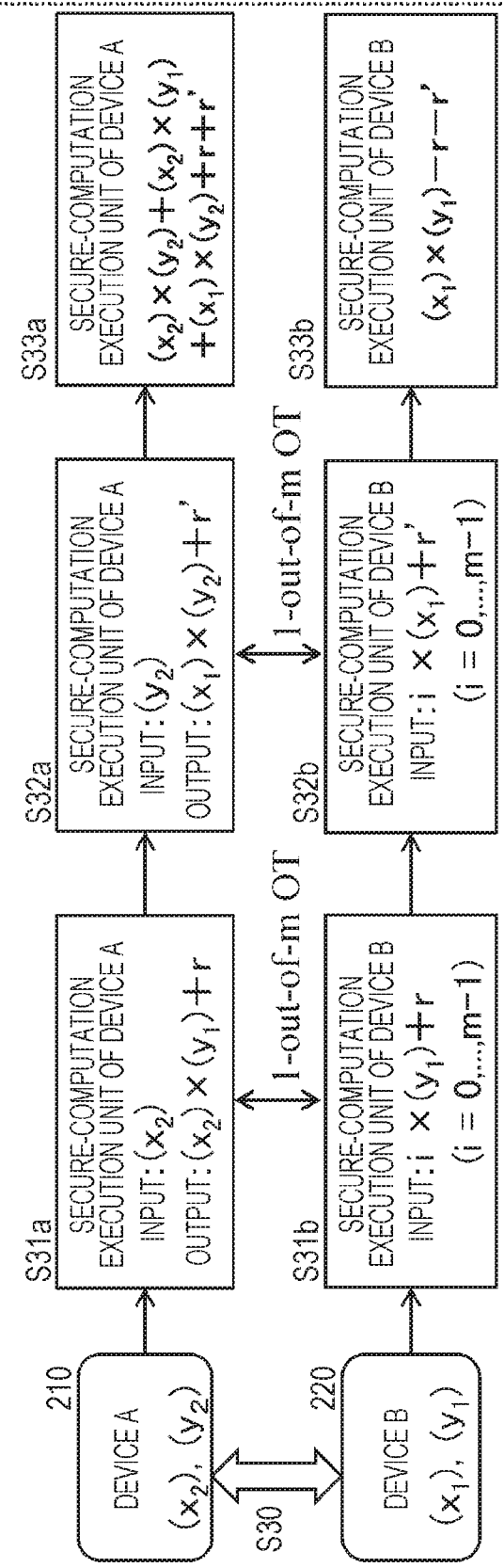
FIG. 6 is a diagram for describing exemplary processing of calculating a multiplied result of the secure data with the secure computation.

FIG. 6 is a diagram of exemplary processing of calculating a multiplied value of the secure data with the secure computation based on the GMW scheme.

The device A 210 retains the secure data X.

In addition, the device B 220 retains the secure data Y.

The secure data X and the secure data Y are the secure data undesirable to release.

The device A 210 segments the secure data X into two pieces of data:

$$X=((x\_1)+(x\_2)) \bmod m.$$

In this manner, the secure data X is randomly segmented to generate the two pieces of segmented data $(x\_1)$ and $(x\_2)$.

Meanwhile, the device B 220 also segments the secure data Y into two pieces of data:

$$Y=((y\_1)+(y\_2)) \bmod m.$$

In this manner, the secure data Y is randomly segmented to generate the two pieces of segmented data $(y\_1)$ and $(y\_2)$.

At step S30 illustrated in FIG. 6, the device A 210 provides the computation-processing execution unit of the device B 220 with the segmented data $(x\_1)$.

Meanwhile, the device B 220 provides the computation-processing execution unit of the device A 210 with the segmented data $(y\_2)$.

X and Y are the secure data, and thus are not allowed to leak.

However, even if only one piece of data of the pieces of segmented data $(x\_1)$ and $(x\_2)$ of X is acquired, the secure data X cannot be specified.

Similarly, even if only one piece of data of the pieces of segmented data $(y\_1)$ and $(y\_2)$ of Y is acquired, the secure data Y cannot be specified.

Therefore, only partial data of the segmented data of the secure data, is insufficient to specification of the secure data, and thus is allowed to be output outward.

In this manner, the device A 210 outputs the segmented data $(x\_1)$ to the computation-processing execution unit of the device B 220.

Meanwhile, the device B 220 outputs the segmented data $(y\_2)$ to the computation-processing execution unit of the device A 210.

Processing in the computation-processing execution unit of the device A 210 will be described.

The device A 210 retains the pieces of segmented data $(x\_1)$ and $(x\_2)$ of X and the segmented data $(y\_1)$ of Y received from the device B 220.

The processing is performed by the following procedure.
(Step S31a)

The computation-processing execution unit of the device A 210 performs [1-out-of-m OT] having an input/output value setting including an input value being $x\_2$ and an output value $M(x\_2)$ satisfying $M\_(x\_2)=(x\_2) \times (y\_1)+r$, together with the device B 220.

Note that [1-out-of-m Oblivious Transfer (OT)] is an arithmetic protocol for performing the following processing.

Two entities being a sender and a selector are present.

The sender has an input value $(M\_0, M\_1, \ldots, M\_(m-1))$ including m number of elements.

The selector has an input value being $\sigma \in \{0, 1, \ldots, m-1\}$.

The selector requests the sender having the m number of elements to send one element, so that the selector can acquire only the value of one element $M\_\sigma$. The other $(m-1)$ number of elements: $M\_i$ ($i \neq \sigma$) are not allowed to be acquired.

Meanwhile, the sender is not allowed to know the input value a of the selector.

In this manner, the [1-out-of-m OT] protocol is intended for performing arithmetic processing with the transmission and reception of only one element from the m number of elements, and has a setting for preventing which one of the m number of elements has been transmitted and received, from being specified on the element reception side.

(Step S32a)

The computation-processing execution unit of the device A 210 performs [1-out-of-m OT] having an input/output value setting including an input value being $y\_2$ and an output value $M\_(y\_2)'$ satisfying $M\_(y\_2)'=(x\_1) \times (y\_2)+r'$, together with the device B 220.

(Step S33a)

As the output value of the device A 210, an output value: $M\_(x\_2)+M\_(y\_2)$ is computed in accordance with the following expression:

$$M\_(x\_2)+M\_(y\_2)=((x\_2) \times (y\_2)+(x\_2) \times (y\_1)+r+(x\_1) \times (y\_2)+r') \bmod m.$$

Processing in the computation-processing execution unit of the other device B 220 will be described.

The device B 220 retains the pieces of segmented data $(y\_1)$ and $(y\_2)$ of Y and the segmented data $(x\_1)$ of X received from the device A 210.

The processing is performed by the following procedure.
(Step S31b)

With selection of a random number $r \in \{0, \ldots, m-1\}$, an input value string to be used for [1-out-of-m OT] is generated on the basis of the segmented value y_1 of the secure data Y, the input value string being i×(y_1)+r, note that i=0, 1, ..., (m−1).

Specifically, the following input value strings: M_0 to M_(m−1) are generated:

$$M\_0 = 0 \times (y\_1) + r,$$

$$M\_1 = 1 \times (y\_1) + r,$$

..., and $$M\_(m-1) = (m-1) \times (y\_1) + r.$$

The input value strings are generated.

Furthermore, the computation-processing execution unit of the device B 220 performs [1-out-of-m OT] based on the setting at step S31a described above, together with the device A 210.

(Step S32b)

With selection of a random number r'∈{0, ..., m−1}, an input value string to be used for [1-out-of-m OT] is generated on the basis of the segmented value y_1, the input value string being i×(x_1)+r', note that, i=0, 1, ..., (m−1).

Specifically, the following input value strings: M'_0 to M'_(m−1) are generated:

$$M'\_0 = 0 \times (x\_1) + r',$$

$$M'\_1 = 1 \times (x\_1) + r'$$

..., and $M'\_(m-1) = (m-1) \times (x\_1) + r'.$

The input value strings are generated.

Furthermore, the computation-processing execution unit of the device B 220 performs [1-out-of-m OT] based on the setting at step S32a described above, together with the device A 210.

(Step S33b)

The following output value is computed as the output value of the device B 220:

$$((x\_1) \times (y\_1) - r - r') \bmod m.$$

The value is computed as the output value of the device B 220.

The following computation processing with the output value calculated by the device A 210 at step S33a and the output value calculated by the device B 220 at step S33b can calculate the multiplied value X×Y of the secure data X and the secure data Y:

$$((x\_2) \times (y\_2) + (x\_2) \times (y\_1) + r + (x\_1) \times (y\_2) + r') +$$
$$((x\_1) \times (y\_1) - r - r') = ((x\_1) + (x\_2)) \times ((y\_1) + (y\_2)) = X + Y.$$

The mutual provision of the calculated result at step S33a and the calculated result at step S33b between the device A 210 and the device B 220, can calculate the multiplied value X×Y of the secure data X and the secure data Y.

In this manner, both the device A and the device B can calculate, without outputting the secure data X and the secure data Y outward, respectively, the multiplied value of the secure data X and the secure data Y, namely, XY.

The processing illustrated in FIG. 6 is exemplary processing of calculating the multiplied value of the secure data, applied with the secure computation based on the GMW scheme.

Note that the processing described with reference to FIG. 6 includes an outline of the processing of calculating the multiplied value of the secure data X and the secure data Y, in a simple manner. For practical addition processing or multiplication processing of the secure data, typically, the secure computation is required to be performed repeatedly, for example, by applying a computed result acquired by first secure computation, to an input value of the next secure computation.

In addition, the exemplary secure computation processing illustrated in FIG. 5 or 6 is an example of the secure computation, and other various different types of computation processing can be applied for modes of the secure computation.

However, the secure computation causes generation of the converted data, transmission and reception of the converted data between the devices, and computation processing applied with the converted data, to increase in processing, in response to the volume of the secure data to be applied to the computation. Specifically, for example, an oblivious transfer protocol large in computational complexity is required to be performed in multiplication processing with the secure computation. The oblivious transfer protocol is excessively large in computational complexity. The reason is, for example, that an exponentiation operation of a multiple-precision integer as to be used in public key cryptography is required.

For example, in a case where the inner product is acquired for all combinations of k number of vectors each including n number of elements and m number of vectors each including n number of elements, kmn number of times of secure multiplication are required in total.

Calculation of the secure multiplication with the typical secure computation, as described with reference to FIG. 5 or 6, enormously increases in computational complexity and in communication fee to make an increase in required computational resources or computational time, and thus there is a problem that the calculation exceeds a practical level.

[4. Processing of Estimating Relationship between Secure Data with Secure Computation Reduced in Computational Complexity]

A configuration of solving the problem, namely, processing of calculating the relationship between secure data, such as correlation or similarity, with application of the secure computation reduced in computational complexity, will be described below.

FIG. 7 is a diagram of an exemplary configuration of one information processing system that performs the processing according to the present disclosure.

As illustrated in FIG. 7, two information processing devices A 110 and 120 are present.

The information processing devices A 110 and B 120 are information processing devices of two different companies that are, for example, the companies 1 and 2 being the two different Internet distributors.

The company 1 has the information processing device A 110, and a storage unit of the information processing device A 110 retains, for example, user-based merchandise-purchase history data similar to those described with reference to FIGS. 1, 2A, 2B, 3A, 3B, and 4 and the like.

The company 2 has the information processing device B 120, and a storage unit of the information processing device B 120 retains, for example, user-based merchandise-purchase history data similar to those described with reference to FIGS. 1, 2A, 2B, 3A, 3B and 4 and the like.

FIGS. 8A and 8B illustrate exemplary pieces of secure data retained in the storage units of the two information processing devices A 110 and B 120.

The data illustrated in FIG. 8A includes the user-based merchandise-purchase history data amassed by the company 1, stored in the storage unit of the information processing device A 110 possessed by the company 1, and indicates what merchandise users 1 to n each have purchased from pieces of merchandise 1, 1 to 1, k (item: I_(1, 1) to I_(1, k)) provided by the company 1.

The data illustrated in FIG. 8B includes the user-based merchandise-purchase history data amassed by the company 2, stored in the storage unit of the information processing device B 120 possessed by the company 2, and indicates what merchandise users 1 to n each have purchased from pieces of merchandise 2, 1 to 2, m (item: I_(2, 1) to I_(2, m)) provided by the company 2.

As described with reference to FIG. 1 or the like, the data illustrated in FIGS. 8A and 8B includes merchandise-purchase history identification information set, the merchandise-purchase history identification information including:

[1] for presence of merchandise-purchase history; and
[0] for absence of merchandise-purchase history.

FIGS. 8A and 8B each illustrate the merchandise-purchase history information for the same number of users: 1 to n.

x (x=1) indicated in I_(x, y) of each of the pieces of merchandise 1, 1 to 1, k (item: I_(1, 1) to I_(1, k)) illustrated in FIG. 8A represents an identifier of the company or the information processing device retaining the secure data, and y (y=1 to k) represents a merchandise identifier.

Similarly, x (x=2) indicated in I_(x, y) of each of the pieces of merchandise 2, 1 to 2, m (item: I_(2, 1) to I_(2, m)) illustrated in FIG. 8B represents an identifier of the company or the information processing device retaining the secure data, and y (y=1 to m) represents a merchandise identifier.

The company 1 illustrated in FIG. 8A retains the purchase history information regarding k types of merchandise for n number of users, and the company 2 illustrated in FIG. 8B retains the purchase history information regarding m types of merchandise for the n number of users.

FIGS. 8A and 8B illustrate the respective pieces of user-based merchandise-purchase history data individually amassed by the two different companies, for example, the company 1 and the company 2 being the two different Internet distributors, and integration and analysis of respective individual databases retained by the companies enables merchandise sales or advertising provision to be more effective.

However, each piece of data is the secure data subject to restriction of release.

Therefore, the respective pieces of secure data stored in the information processing devices A 110 and B 120 of the companies are not allowed to be directly transmitted or received between the information processing devices.

Performance of the processing to be described below according to the present disclosure enables the index value, such as the Jaccard similarity coefficient described earlier or the inner product between the purchase vectors, indicating the association between the respective pieces of secure data retained by the two information processing devices A 110 and B 120, to be calculated more efficiently without transmission and reception of the respective pieces of secure data between the information processing devices.

FIG. 9 illustrates a correspondence table of the Jaccard similarity coefficient being one index value indicating the association between the respective pieces of secure data retained by the two information processing devices A 110 and B 120.

As described earlier with reference to (Expression 2), the Jaccard similarity coefficient is calculated as a value indicating the degree of inter-vector similarity between the purchase vector of merchandise a and the purchase vector of merchandise b, the purchase vector of the merchandise a being an n-dimensional vector corresponding to the number of users n, indicating the users having purchased the merchandise a, the purchase vector of the merchandise b being an n-dimensional vector corresponding to the number of users n, indicating the users having purchased the merchandise b.

FIG. 9 illustrates the table (matrix) having k+m number of merchandise identifiers set in the horizontal axis and the vertical axis, the k+m number of merchandise identifiers relating to the pieces of provided merchandise 1, 1 to 1, k (item: I_(1, 1) to I_(1, k)) of the company 1 retaining the information processing device A 110 and the pieces of provided merchandise 2, 1 to 2, m (item: I_(2, 1) to I_(2, m)) of the company 2 retaining the information processing device B 120.

For example, the Jaccard similarity coefficient is calculated as a value indicating the degree of similarity between the purchase vectors of two different pieces of merchandise.

In a case where k+m number of types of merchandise are provided as in FIG. 9, the Jaccard similarity coefficient between different pieces of merchandise (merchandise i and merchandise j) can be calculated in regions (1), (2), and (3) in the matrix illustrated in FIG. 9.

The region (1) is the Jaccard-similarity-coefficient calculation region between the pieces of provided merchandise 1, 1 to 1, k (item: I_(1, 1) to I_(1, k)) of the company 1 retaining the information processing device A 110.

The region (2) is the Jaccard-similarity-coefficient calculation region between the pieces of provided merchandise 1, 1 to 1, k (item: I_(1, 1) to I_(1, k)) of the company 1 retaining the information processing device A 110 and the pieces of provided merchandise 2, 1 to 2, m (item: I_(2, 1) to I_(2, m)) of the company 2 retaining the information processing device B 120.

The region (3) is the Jaccard-similarity-coefficient calculation region between the pieces of provided merchandise 2, 1 to 2, m (item: I_(2, 1) to I_(2, m)) of the company 2 retaining the information processing device B 120.

The Jaccard similarity coefficient to be calculated in the regions is expressed in (Expression 4a) to (Expression 4c) below.

[Math. 4]

$$J_{ij} = \frac{x_i^T \cdot x_j}{|x_i| + |x_j| - x_i^T \cdot x_j} \quad (1 \leq i < j \leq k) \quad \text{(Expression 4a)}$$

$$J_{ij} = \frac{x_i^T \cdot y_j}{|x_i| + |y_j| - x_i^T \cdot y_j} \quad (1 \leq i \leq k, 1 \leq j \leq m) \quad \text{(Expression 4b)}$$

$$J_{ij} = \frac{y_i^T \cdot y_j}{|y_i| + |y_j| - y_i^T \cdot y_j} \quad (1 \leq i < j \leq m) \quad \text{(Expression 4c)}$$

(Expression 4a) is the Jaccard-similarity-coefficient calculation expression in the region (1).

(Expression 4b) is the Jaccard-similarity-coefficient calculation expression in the region (2).

(Expression 4c) is the Jaccard-similarity-coefficient calculation expression in the region (3).

The Jaccard similarity coefficient $J\_ij$ indicates the amount of inter-item correlation between the item (merchandise) $I\_i$ and the item (merchandise) $I\_j$.

(Expression 4a) above being the Jaccard-similarity-coefficient calculation expression in the region (1), is similar to (Expression 2) described earlier.

$x\_i$ and $x\_j$ each are a matrix including information regarding the merchandise-purchase status (purchased: 1, not-purchased: 0) of the n number of users (users 1 to n) for any of the pieces of provided merchandise 1, 1 to 1, k (item: $I\_(1, 1)$ to $I\_(1, k)$) of the company 1 retaining the information processing device A 110.

$x\_i$ and $x\_j$ each are a matrix (n-dimensional vector) as expressed in (Expression 3a) described earlier.

In addition, $x^T\_i$ is the transposed matrix of $x\_i$, and is a matrix (n-dimensional vector) as expressed in (Expression 3b) described earlier.

Therefore, the Jaccard similarity coefficient in the region (1) illustrated in FIG. 9 can be calculated inside the information processing device A 110 with only the data (secure data) stored in the information processing device A 110 of the company 1.

In addition, $y\_i$ and $y\_j$ in (Expression 4c) being the Jaccard-similarity-coefficient calculation expression in the region (3) each are a matrix including information regarding the merchandise-purchase status (purchased: 1, not-purchased: 0) of the n number of users (users 1 to n) for any of the pieces of provided merchandise 2, 1 to 2, m (item: $I\_(2, 1)$ to $I\_(2, m)$) of the company 2 retaining the information processing device B 120.

Therefore, the Jaccard similarity coefficient in the region (3) illustrated in FIG. 9 can be calculated inside the information processing device B 120 with only the data (secure data) stored in the information processing device B 120 of the company 2.

In contrast to this, (Expression 4b) being the Jaccard similarity coefficient in the region (2) includes:

the matrix: $x\_i$ including the information regarding the merchandise-purchase status (purchased: 1, not-purchased: 0) of the n number of users (users 1 to n) for any of the pieces of provided merchandise 1, 1 to 1, k (item: $I\_(1, 1)$ to $I\_(1, k)$) of the company 1 retaining the information processing device A 110; and the matrix: $y\_i$ including the information regarding the merchandise-purchase status (purchased: 1, not-purchased: 0) of the n number of users (users 1 to n) for any of the pieces of provided merchandise 2, 1 to 2, m (item: $I\_(2, 1)$ to $I\_(2, m)$) of the company 2 retaining the information processing device B 120.

Therefore, the Jaccard similarity coefficient in the region (2) illustrated in FIG. 9 cannot be calculated without both of the data (secure data) stored in the information processing device A 110 of the company 1 and the data (secure data) stored in the information processing device B 120 of the company 2.

That is, the secure computation described earlier with reference to FIGS. 5 and 6, is required to be performed in order to calculate the Jaccard similarity coefficient in the region (2)

For example, after converting the secure data stored in the storage unit of the information processing device A 110 and providing the converted data to the information processing device B 120, and similarly converting the secure data stored in the storage unit of the information processing device B 120 and providing the converted data to the information processing device A 110, calculation is required with the secure computation applied with the converted data. That is, for example, the secure computation described earlier with reference to FIGS. 5 and 6 is required to be performed.

As described with reference to FIGS. 5 and 6, there is a problem that the secure computation causes generation of the converted data, transmission and reception, and computation with the converted data to increase in processing cost.

The secure computation is efficiently performed in the processing to be described below according to the present disclosure. That is, without transmission and reception of the secure data between the information processing devices, the index value, such as the Jaccard similarity coefficient described earlier or the inner product between the purchase vectors, indicating the association between the respective pieces of secure data retained by the two information processing devices A 110 and B 120, can be calculated more efficiently.

The processing will be specifically described below.

Note that the value of the Jaccard similarity coefficient expressed in (Expression 4a) to (Expression 4c) depends on the inner product of the purchase status data ($x^i\_t$) of the item (merchandise) $I\_i$ and the purchase status data ($x^j\_t$) of the item (merchandise) $I\_j$, namely, the inner product between the purchase vectors, as expressed in (Expression 2a) described earlier.

That is, calculation of the inner product of the purchase status data ($x^i\_t$) of the item (merchandise) $I\_i$ and the purchase status data ($x^j\_t$) of the item (merchandise) $I\_j$ (inner product of the purchase vectors) enables the inner product to be used as the correlation (similarity) index value between the items.

Processing of efficiently calculating the inner product between the purchase vectors, will be described below as exemplary specific processing.

Note that, as interpreted from the relationship between (Expression 2) and (Expression 2a) described earlier, the Jaccard similarity coefficient can be calculated with application of the calculated inner product.

[4-a. Exemplary Setting in Precondition for Performance of Processing According to Present Disclosure]

First, exemplary setting in a precondition for performance of the processing according to the present disclosure will be described.

As illustrated in FIG. 7, the two information processing devices A 110 and 120 are present.

The information processing devices A 110 and B 120 are the information processing devices of the two different companies that are, for example, the companies 1 and 2 being the two different Internet distributors.

The company 1 has the information processing device A 110, and the storage unit of the information processing device A 110 retains, for example, the user-based merchandise-purchase history data similar to those described with reference to FIGS. 1, 2A, 2B, 3A, 3B, and 4 and the like.

The company 2 has the information processing device B 120, and the storage unit of the information processing device B 120 retains, for example, the user-based merchandise-purchase history data similar to those described with reference to FIGS. 1, 2A, 2B, 3A, 3B, and 4 and the like.

Specifically, for example, the pieces of user-based merchandise-purchase history data are similar to the data illustrated in FIGS. 8A and 8B described earlier.

As described with reference to FIG. 1 or the like, the data illustrated in FIGS. 8A and 8B includes the merchandise-purchase history identification information set, the merchandise-purchase history identification information including:

[1] for presence of merchandise-purchase history; and

[0] for absence of merchandise-purchase history.

The following description of the processing of calculating the correlation between the pieces of secure data will be given with data as illustrated in FIGS. 10A and 10B replacing the data (1, 0) of the merchandise-purchase history status illustrated in FIGS. 8A and 8B.

As illustrated in FIGS. 10A and 10B, the information processing devices A 110 and B 120 each have the merchandise-purchase history data corresponding to the same n number of users.

$x^i\_t$ represents the user-based merchandise-purchase history information stored in the information processing device A 110 of the company 1, and indicates the purchase status of the item (merchandise) I_i of the user having the user ID=t.

$y^j\_t$ represents the user-based merchandise-purchase history information stored in the information processing device B 120 of the company 2, and indicates the purchase status of the item (merchandise) I_j of the user having the user ID=t.

Note that the pieces of data each are the secure data not allowed to be released or leak.

As illustrated in FIGS. 10A and 10B, the information processing device A 110 stores, in the storage unit, the following data, namely, the secure data xi_t (i=1 to k, t=1 to n) as the merchandise-purchase history information regarding the n number of users (users 1 to n) for the k pieces of merchandise 1 to k(item: I_1 to I_k).

Meanwhile, the information processing device B 120 stores, in the storage unit, the following data, namely, the secure data $y^j\_t$ (j=1 to m, t=1 to n) as the merchandise-purchase history information regarding the n number of users (users 1 to n) for the m pieces of merchandise 1 to m (item: J_1 to J_m).

An object of the processing to be described below is to acquire the correlation between the following pieces of data: the merchandise-purchase history information being the secure data retained by the information processing device A 110, namely, $x^i\_t$ (i=1 to k, t=1 to n); and the merchandise-purchase history information being the secure data retained by the information processing device B 120, namely, $y^j\_t$ (j=1 to m, t=1 to n)

Examples of the correlation index value include the Jaccard similarity coefficient described above and the inner product (inner product of the purchase vectors).

The merchandise-purchase history information being the secure data retained by the information processing device A 110 is defined as data D1, and the merchandise-purchase history information being the secure data retained by the information processing device B 120 is defined as data D2.

The data D1 and the data D2 each include the following data.

(Data D1)

k number of vectors (=the number of pieces of merchandise) each including n number of elements (=the number of users): $x\_i = (x^i\_1, x^i\_2, \ldots, x^i\_n)^T$, $(1 \leq i \leq k)$, and $x^i\_t \in \{0, 1\}$.

(Data D2)

m number of vectors (=the number of pieces of merchandise) each including n number of elements (=the number of users): $y\_j = (y^j\_1, y^j\_2, \ldots, y^j\_n)^T$, $(1 \leq j \leq m)$, and $y^j\_t \in \{0, 1\}$.

From the two pieces of secure data D1 and D2, for example, the correlation index value between a vector included in the data D1 and a vector included in the data D2 (Jaccard similarity coefficient or inner product between the vector elements) is calculated with the secure computation without sharing the pieces of data mutually.

Note that the data D1 includes the k number of vectors corresponding to the number of pieces of merchandise k provided by the company 1.

Meanwhile, the data D2 includes the m number of vectors corresponding to the number of pieces of merchandise m provided by the company 2.

For example, if it is determined that the correlation is high between one vector V1 in the k number of vectors corresponding to the number of pieces of merchandise k provided by the company 1 and one vector V2 in the m number of vectors corresponding to the number of pieces of merchandise m provided by the company 2, it is determined that a user having purchased the merchandise corresponding to the vector V1 is highly likely to purchase the merchandise corresponding to the vector V2.

Specifically, for example, an n-dimensional vector (1, 1, 1, 0, 1, . . . , 1) corresponding to the number of users n, indicating the users having purchased the merchandise I_1 in the data illustrated in FIG. 10A and an n-dimensional vector (0, 1, 0, 0, 1, . . . , 0) corresponding to the number of users n, indicating the users having purchased the merchandise J_1 in the data illustrated in FIG. 10B are individually generated and then the degree of similarity (amount of correlation) between the vectors is calculated.

If the degree of similarity (amount of correlation) between the vectors is high, it can be estimated that a user having purchased the merchandise I_1 is highly likely to purchase the different merchandise J_1.

Meanwhile, in a case where the degree of similarity (amount of correlation) between the vectors is low, it can be estimated that the user having purchased the merchandise I_1 is less likely to purchase the different merchandise J_1.

Processing of calculating km number of inner products: IP_ij expressed in (Expression 5) below as the correlation index value indicating the similarity between the vectors will be first described below.

[Math. 5]

$$IP_{ij} = x_i^T \cdot y_j = \sum_{t=1}^{n} x_t^i \cdot y_t^j \quad (1 \leq i \leq k, 1 \leq j \leq m) \quad \text{(Expression 5)}$$

The inner-product computation based on (Expression 5) above needs mutual computation of the secure data individually stored in the two different information processing devices.

$x^i\_t$ represents the secure data stored in the information processing device A 110, and includes data (1 or 0) indicating whether the user t has purchased the merchandise i.

Meanwhile, $y^j\_t$ represents the secure data stored in the information processing device B 120, and includes data (1 or 0) indicating whether the user t has purchased the merchandise j.

$x^i\_t$ and $y^j\_t$ each being the secure data, are not allowed to be directly transmitted and received between the information processing devices A 110 and B 120.

[4-b. Outline of Processing of Achieving High-Speed Computation]

In the inner-product computation based on (Expression 5) above, the inner product is calculated with multiplication of all combinations of the k number of vectors (=the number of pieces of merchandise provided by the company 1) each including the n number of elements (=the number of users)

and the m number of vectors (=the number of pieces of merchandise provided by the company 2) each including the n number of elements.

In this case, kmn number of times of secure multiplication are required in total.

For example, performance of the computation in accordance with the secure computation described earlier with reference to FIG. 6 causes generation of converted data, transmission and reception of the converted data, and computation processing with the converted data to be enormous in processing.

In the processing to be described below according to the present disclosure, computation processing is performed with the sample ID (user ID: t) having 1 in value (=presence of purchase history), instead of a vector including the data of 1 or 0 indicating the purchase history of each user, namely, 1 (=presence of purchase history) or 0 (=absence of purchase history).

That is, the merchandise-purchase history information: the data D1 being the secure data retained by the information processing device A 110 and the merchandise-purchase history information: the data D2 being the secure data retained by the information processing device B 120, described earlier are converted as below.

The merchandise-purchase history information: the data D1 being the secure data retained by the information processing device A 110 is converted as below.

(Data D1)

The k number of vectors (=the number of pieces of merchandise) each including the n number of elements (=the number of users): $x\_i=(x^i\_1, x^i\_2, \ldots, x^i\_n)^T$, $(1 \le i \le k)$, and $x^i\_t \in \{0, 1\}$.

On the basis of the data D1, a set: C_i of k groups of sample IDs (user IDs) is generated, each group including the user ID (t) of the user having the purchase history for the merchandise (i=1 to k).

The set: C_i is expressed in (Expression 6) below.

[Math. 6]

$$C_i = \{c_1^i, \ldots, c_{v_i}^i\} \quad \text{(Expression 6)}$$

Note that, $$(1 \le i \le k), c_t^i \in \{1, 2, \ldots, n\}$$

$$v_i = \Sigma_{t=1}^n x_t^i$$

Note that, in (Expression 6) above, v_i represents the number of IDs having 1 in value in x_i.

The user ID=t satisfying $x^i\_t=1$ in the vector: x_i, is included as an element of the set: C_i expressed in (Expression 6) above.

Note that the user ID=1, 2, . . . , n is used as the ID in the present embodiment, but a combination of other identifiable numerical values can be used instead.

In addition, the merchandise-purchase history information: the data D2 being the secure data retained by the information processing device B 120 is converted as below.

(Data D2)

The m number of vectors (=the number of pieces of merchandise) each including the n number of elements (=the number of users): $y\_j=(y^j\_1, y^j\_2, \ldots, y^j\_n)^T$, $(1 \le j \le m)$, and $y^j\_t \in \{0, 1\}$.

On the basis of the data D2, a set: S_i of m groups of sample IDs (user IDs) is generated, each group including the user ID (t) of the user having the purchase history for the merchandise (j=1 to m).

The set: S_i is expressed in (Expression 7) below.

[Math. 7]

$$S_j = \{s_1^j, \ldots, s_{w_j}^j\} \quad \text{(Expression 7)}$$

Note that, $$(1 \le i \le m), s_i^j \in \{1, 2, \ldots, n\}$$

$$w_j = \Sigma_{t=1}^n y_t^j$$

Note that, in (Expression 7) above, w_i represents the number of IDs having 1 in value in y_i.

The user ID=t satisfying $y^j\_t=1$ in the vector: y_j, is included as an element of the set: S_j expressed in (Expression 7) above.

Note that the user ID=1, 2, . . . , n is used as the ID in the present embodiment, but a combination of other identifiable numerical values can be used instead.

Performance of such conversion can reduce the number of input values.

For example, when the density being the ratio of a set value=1 (presence of user purchase history) in number, is 1% in a case where the number of IDs (number of users n) is one million, use of the vectors indicated as the data D1 and the data D2, namely, use of the k number of vectors (=the number of pieces of merchandise) each including the n number of elements (=the number of users): $x\_i=(x^i\_1, x^i\_2, \ldots, x^i\_n)^T$ and the m number of vectors (=the number of pieces of merchandise) each including the n number of elements (=the number of users): $y\_j=(y^j\_1, y^j\_2, \ldots, y^j\_n)^T$ as vector expression, causes a one-million-dimensional input value.

However, expression with the sets: C_i and S_j described above, namely, the sets: C_i and S_j expressed in (Expression 6) and (Expression 7), respectively, can reduce the one-million-dimensional input value to a myriad-order input value.

In the processing to be described below according to the present disclosure, with comparison between the two sets and acquisition of the number of duplicated IDs, the inner product based on the number of duplicated IDs is acquired.

For example, in a case where the following expressions are provided: C={1, 2, 3} and S={2, 3, 4}, there is duplication for 2 and 3.

The number of duplicated IDs is two, so that the output (inner product) is two.

The output value corresponding to the number of duplicated IDs, has a larger value in a case where the number of duplicated IDs is large, and has a small value in a case where the number of duplicated IDs is small.

That is, a larger output value indicates that the number of duplicated IDs is large, and thus indicates that the same user IDs are included in quantity in the two sets.

That is, the value of the inner product indicates the degree of user-purchase similarity between two pieces of merchandise, similarly to the Jaccard similarity coefficient described earlier.

Note that, for example, a private set intersection cardinality (PSI-CA) protocol is available to a protocol (computation scheme) for performing the arithmetic, keeping security equivalent to that of the secure computation.

Note that the details of the PSI-CA protocol is described in, for example, a document [E. D. Cristofaro, P. Gasti and G. Tsudik, Fast and Private Computation of Cardinality of Set Intersection and Union, Cryptology and Network Security, pp. 218-231, 2012].

The details of computation processing applied with the PSI-CA protocol will be described later.

[4-c. Exemplary Processing of Calculating Relationship between Secure Data with Secure Computation Reduced in Computational Complexity]

Next, exemplary processing of calculating the relationship between the secure data with the secure computation reduced in computational complexity will be described.

FIG. 11 is a diagram of partial configurations of the information processing devices A 110 and B 120 each retaining the secure data, such as the merchandise-purchase history information.

The information processing device A 110 includes an input unit 111, a random-number generation unit 112, a hash computation unit 113, an arithmetic operation unit 114, an element comparison unit 115, a data transmission/reception unit 116, and an output unit 117.

The information processing device B 120 includes an input unit 121, a random-number generation unit 122, a hash computation unit 123, an arithmetic operation unit 124, a random permutation unit 125, a data transmission/reception unit 126, and an output unit 127.

Figure 12:
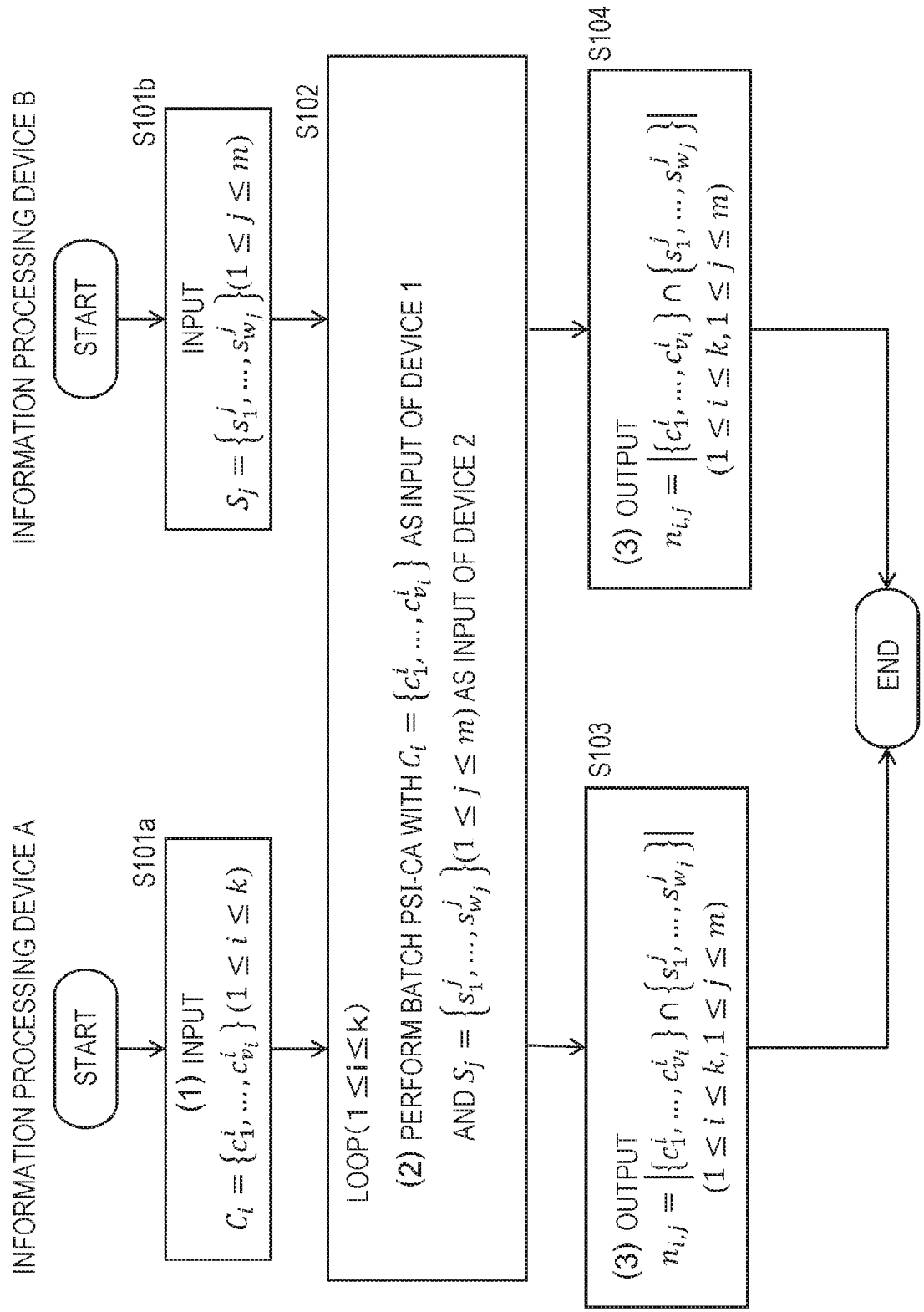
FIG. 12 is a flowchart for describing the sequence of processing of calculating the relationship between the secure data.

FIG. 12 is a flowchart for describing the sequence of the processing of calculating the relationship between the secure data with the devices illustrated in FIG. 11.

The processing illustrated in the flow includes, for example, processing of calculating the inner product of the sets C_i and S_j each including the user ID satisfying the set value=1 (presence of user purchase history) in the merchandise-purchase history data being the secure data retained by two different information processing devices illustrated in FIGS. 10A and 10B.

As described above, as the value of the inner product is larger, it can be determined that the user-purchase correlation (degree of similarity) is higher between the merchandise i and the merchandise j.

The inner-product calculation sequence will be described below with reference to the block diagram illustrated in FIG. 11 and the flowchart illustrated in FIG. 12.

Note that FIG. 13 illustrates respective input values and output values of the information processing devices A and B in the processing to be performed in accordance with the flow illustrated in FIG. 12.

(Steps S101*a* and S101*b*)

The processing at steps S101*a* and S101*b* of the flow illustrated in FIG. 12 includes processing to be performed in the input unit 111 of the information processing device A 110 and processing to be performed in the input unit of the information processing device B 120 illustrated in FIG. 11.

At step S101*a*, the input unit 111 of the information processing device A 110 inputs data retained in the storage unit of the information processing device A 110, for example, the set C_i generated from the user-based merchandise-purchase history data illustrated in FIG. 10A.

Meanwhile, at step S101*b*, the input unit 121 of the information processing device B 120 inputs data retained in the storage unit of the information processing device B 120, for example, the set S_j generated from the user-based merchandise-purchase history data illustrated in FIG. 10B.

The pieces of input data C_i and S_j of the input units 111 and 121 are expressed in (Expression 8a) and (Expression 8b) below, respectively.

[Math. 8]

$$C_i = \{c_1^i, \ldots, c_{v_i}^i\} \quad \text{(Expression 8a)}$$

Note that, $$(1 \leq i \leq k), c_t^i \in \{1, 2, \ldots, n\}$$

$$S_j = \{s_1^j, \ldots, s_{w_j}^j\} \quad \text{(Expression 8b)}$$

Note that, $$(1 \leq i \leq m), s_t^j \in \{1, 2, \ldots, n\}$$

$$w_j = \Sigma_{t=1}^n y_t^j$$

(Step S102)

The next processing at step S102 includes the inner-product calculation processing with the PSI-CA protocol described earlier.

The inner-product calculation processing is performed with the random-number generation unit 112, the hash computation unit 113, the arithmetic operation unit 114, the random permutation unit 115, and the data transmission/reception unit 116 in the information processing device A 110, and the random-number generation unit 122, the hash computation unit 123, the arithmetic operation unit 124, the random permutation unit 125, and the data transmission/reception unit 126 in the information processing device B 120, illustrated in FIG. 11.

The processing at step S102 includes, for example, the processing of calculating the inner product of the sets C_i and S_j each including the user ID satisfying the set value=1 (presence of user purchase history) in the merchandise-purchase history data being the secure data retained by two different information processing devices illustrated in FIGS. 10A and 10B.

For all i ($1 \leq i \leq k$), batch PSI-CA is performed with the sets C_i and S_j expressed in (Expression 8a) and (Expression 8b) as input values, and then the inner product expressed in (Expression 9) below is calculated for each i.

$$n_{i,j} = |\{c_1^i, \ldots, c_{v_i}^i\} \cap \{s_1^j, \ldots, s_{w_j}^j\}| \quad \text{[Math. 9]}$$

Note that, $$1 \leq j \leq m \quad \text{(Expression 9)}$$

The following inner product is output: n_(i, j)=|{c^i_1, ..., c^i_(v_i)}∩{s^j_1, ..., s^j_(w_j)}|, note that ($1 \leq j \leq m$).

The detailed processing of the batch PSI-CA to be performed at step S102, will be described later.

(Steps S103*a* and S103*b*)

The processing at step S103 includes result output processing in the output units.

The result output processing is performed in the output unit 117 of the information processing device A 110 and the output unit 127 of the information processing device B 120 illustrated in FIG. 11.

The output unit 117 of the information processing device A 110 and the output unit 127 of the information processing device B 120 illustrated in FIG. 11 each output the inner product calculated at step S102, namely, the inner product of the sets C_i and S_j in (Expression 10) below.

$$n_{i,j} = |\{c_1^i, \ldots, c_{v_i}^i\} \cap \{s_1^j, \ldots, s_{w_j}^j\}| \quad \text{[Math. 10]}$$

Note that, $$1 \leq i \leq k, 1 \leq j \leq m \quad \text{(Expression 10)}$$

Note that the value of the inner product expressed in (Expression 10) above is output to, for example, respective data processing units of the information processing devices A 110 and B 120.

The data processing unit of each information processing device can determine the user-purchase correlation between the pieces of merchandise with the value of the inner product input.

As described above, as the value of the inner product: n_(i, j) is larger, it can be determined that the user-purchase correlation (degree of similarity) between the merchandise i and the merchandise j is higher.

Note that the calculated inner product and the Jaccard similarity coefficient have the relationship between (Expression 2a) and (Expression 2) described earlier, and thus the Jaccard similarity coefficient can be calculated with the calculated inner product.

[5. Batch Computation Processing Applied with Private Set Intersection Cardinality (PSI-CA) Protocol]

Next, batch computation processing applied with the private set intersection cardinality (PSI-CA) protocol, to be performed as the processing at step S102 of the flowchart illustrated in FIG. 12, will be described.

As a disclosed document of the PSI-CA protocol, the document [E. D. Cristofaro, P. Gasti and G. Tsudik, Fast and Private Computation of Cardinality of Set Intersection and Union, Cryptology and Network Security, pp. 218-231, 2012] has been given earlier.

However, the protocol described in the document is just for acquiring the number of common elements between one set and one set.

In contrast to this, the processing according to the present disclosure is to acquire the number of common elements between one set and a plurality of sets.

For example, in the present processing, the set: C_i includes, as an element, the user ID (t=1 to n) having purchased the merchandise i provided by the company 1.

In addition, the set: S_j includes, as an element, the user ID (t=1 to n) having purchased the merchandise j provided by the company 2.

In the processing according to the present disclosure, m number of inner products indicating respective correlations between one set: C_i and m number of sets: S_j, can be collectively calculated, the one set: C_i including, as an element, the user ID (t=1 to n) having purchased one piece of merchandise i provided by the company 1, the m number of sets: S_j (j=1 to m) each including, as an element, the user ID (t=1 to n) having purchased the merchandise j provided by the company 2.

Specifically, for example, m number of inner products indicating respective correlations between one set: C_1 and the m number of sets: S_j can be collectively calculated, the one set: C_1 including, as an element, the user ID (t=1 to n) having purchased the one piece of merchandise I_1 provided by the company 1, the m number of sets: S_j (j=1 to m) each including, as an element, the user ID (t=1 to n) having purchased the merchandise j provided by the company 2, as illustrated in FIGS. 14A and 14B.

The batch computation processing applied with the PSI-CA protocol will be described below.

Figure 15:
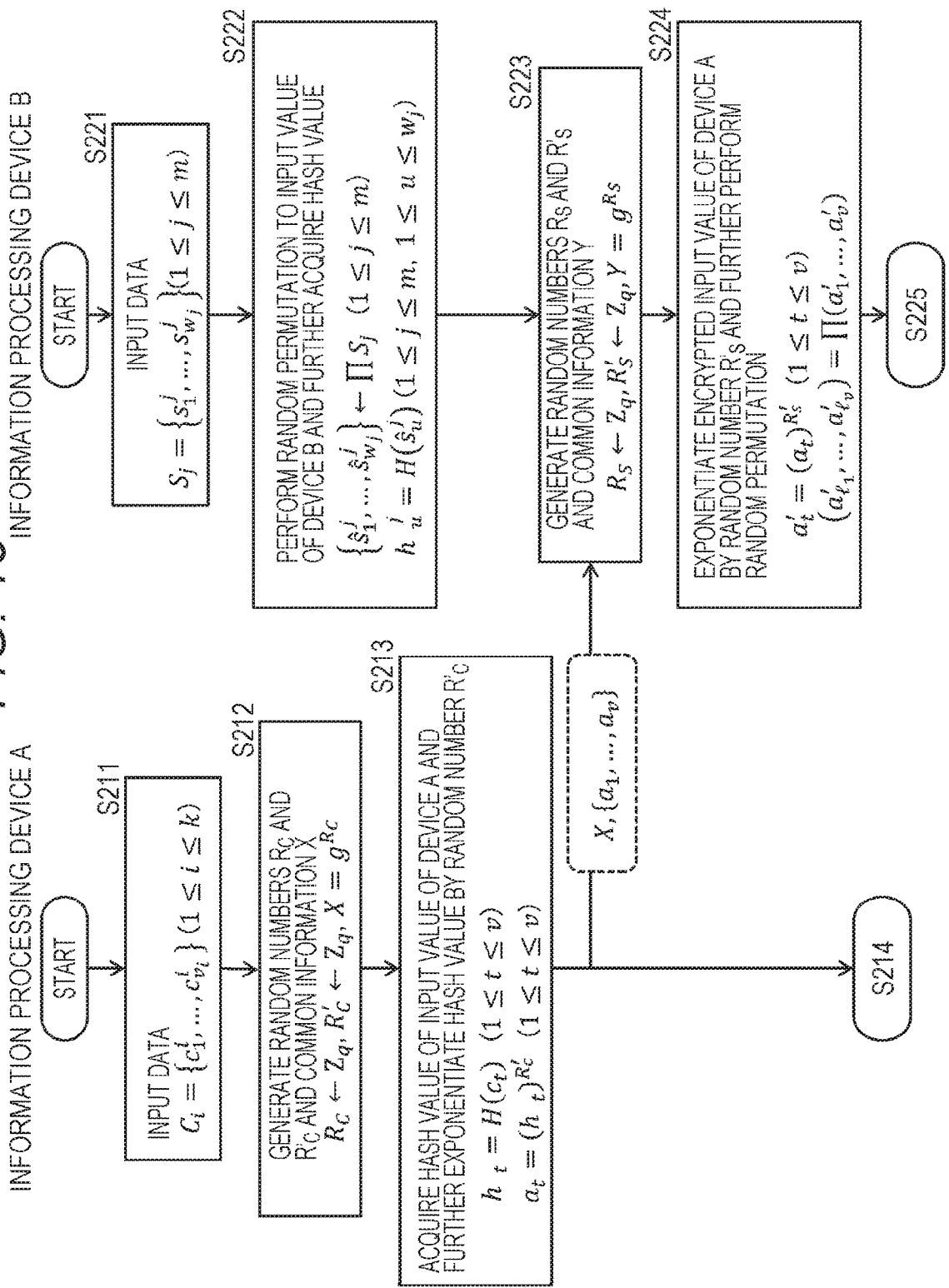
FIG. 15 is a flowchart for describing the sequence of processing of calculating the relationship between the secure data.
Figure 16:
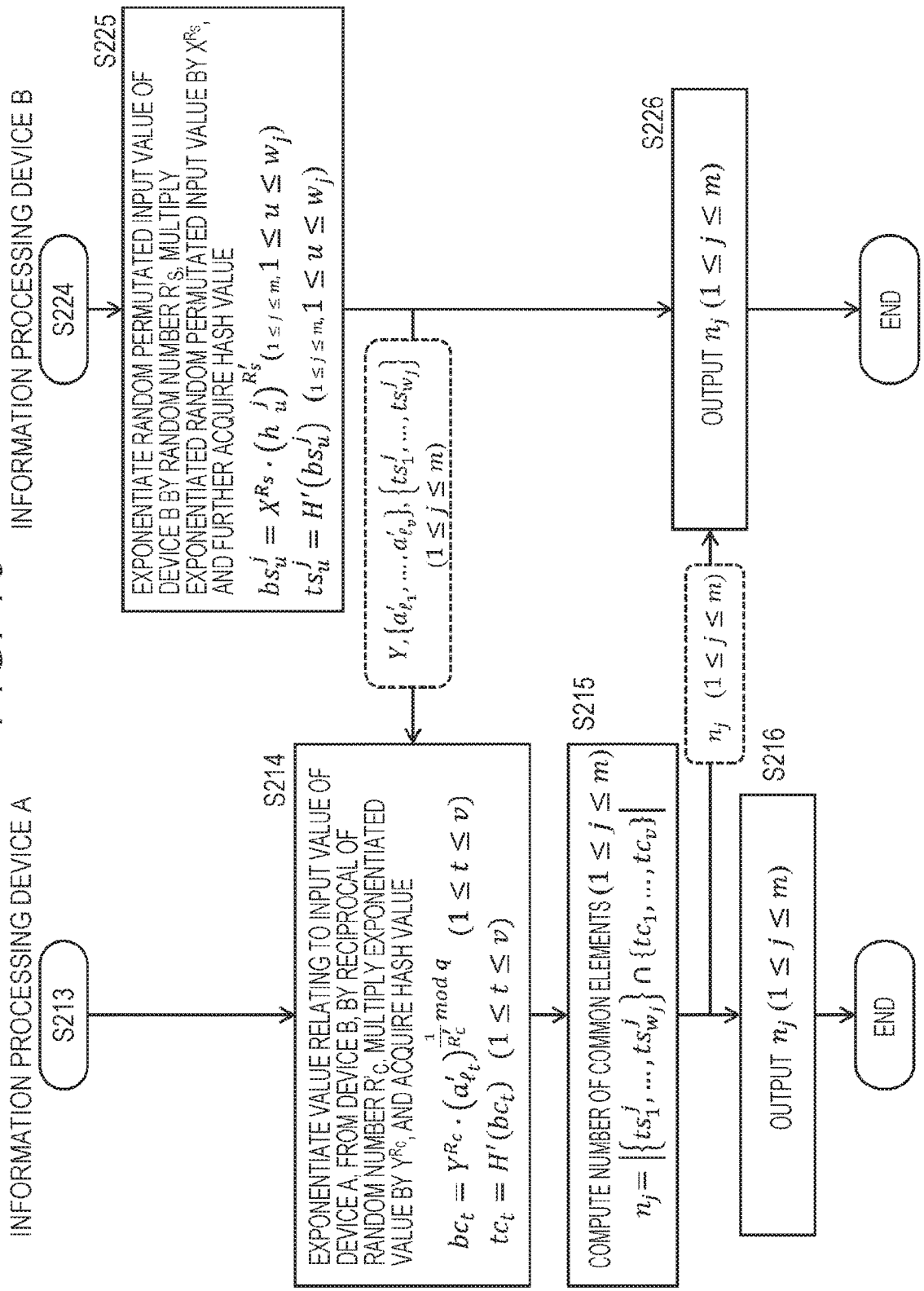
FIG. 16 is a flowchart for describing the sequence of the processing of calculating the relationship between the secure data.

A flowchart illustrated in FIGS. 15 and 16 describes the detailed sequence of the batch computation processing applied with the PSI-CA protocol at step S102 of the flow illustrated in FIG. 12.

Before the description of the flowchart, parameters to be used in the description below will be described.

p and q: two prime numbers to be input in common ((p−1) is divisible by q) Unless otherwise described, all arithmetic is computed on Z_p.

g: a generator for a subgroup being q in size

H: $\{0, 1\}^* \rightarrow Z^*\_p$: a hash function

H': $\{0, 1\}^* \rightarrow \{0, 1\}^x$: a hash function K represents a security parameter.

The details of the processing at each step of the flowchart will be sequentially described below.

Note that the description of each processing step will be given in the following order:

(Description 1) Processing to be performed by the information processing device A 110 illustrated in FIG. 15 (steps S211 to S213)

(Description 2) Processing to be performed by the information processing device B 120 illustrated in FIGS. 15 and 16 (steps S221 to S225)

(Description 3) Processing to be performed by the information processing device A 110 illustrated in FIG. 16 (steps S214 to S216)

(Description 4) Processing to be performed by the information processing device B 120 illustrated in FIG. 16 (step S226).

Note that FIG. 17 illustrates respective input values and output values of the information processing devices A and B in the processing to be performed in accordance with the flow illustrated in FIGS. 15 and 16.

[5-1. (Description 1) Processing to be Performed by Information Processing Device A 110 (Steps S211 to S213)]

First, the processing to be performed by the information processing device A 110 (steps S211 to S213) will be described with reference to the flowchart illustrated in FIG. 15.

(Step S211)

The processing at step S211 of the flow illustrated in FIG. 15 is to be performed in the input unit 111 of the information processing device A 110 illustrated in FIG. 11.

At step S211, the input unit 111 of the information processing device A 110 inputs data retained in the storage unit of the information processing device A 110, for example, a set: C generated from the user-based merchandise-purchase history data illustrated in FIG. 10A.

The set C is given as below:

$$C = \{C\_1, C\_2, \ldots, C\_(v\_i)\}.$$

C_i being an element of the set C, is a one-piece-of-merchandise-based set including, as an element, the user ID (t=1 to n) having purchased one piece of merchandise i provided by the company 1 retaining the information processing device A 110, and is expressed in (Expression 11) below.

[Math. 11]

$$C_i = \{c_1^i, \ldots, c_{v_i}^i\} \qquad \text{(Expression 11)}$$

Note that, $$(1 \le i \le k), c_t^i \in \{1, 2, \ldots, n\}$$

$$v_i = \Sigma_{t=1}^n x_t^i$$

(Step S212)

The processing at step S212 is to be performed by the random-number generation unit 112 and the arithmetic operation unit 114 of the information processing device A 110 illustrated in FIG. 11.

The random-number generation unit 112 generates random numbers R_C and R'_C.

The arithmetic operation unit 114 computes common information X on the basis of the random numbers.

The computation is performed in accordance with a procedure expressed in (Expression 12) below.

[Math. 12]

$$R_C \leftarrow Z_q,$$

$$R'_C \leftarrow Z_q,$$

$$X = g^{R_C} \qquad \text{(Expression 12)}$$

(Step S213)

The processing at step S213 is to be performed by the hash computation unit 113 and the arithmetic operation unit 114 of the information processing device A 110 illustrated in FIG. 11.

The hash computation unit 113 acquires a hash value of the input value (C_t).

Furthermore, the arithmetic operation unit 114 performs processing of exponentiating the hash value calculated by the hash computation unit 113, by the random number R'_C.

Specifically, arithmetic expressed in (Expression 13) below is performed.

[Math. 13]

$$hc_t = H(c_t)(1 \leq t \leq v)$$

$$a_t = (hc_t)^{R'_C}(1 \leq t \leq v) \qquad \text{(Expression 13)}$$

Furthermore, the data transmission/reception unit 116 of the information processing device A 110 illustrated in FIG. 11 transmits the following pieces of data to the information processing device B 120: the common information: $X = g^{R_C}$ and a set: $\{a\_1, \ldots, a\_v\}$.

[5-2. (Description 2) Processing to be Performed by Information Processing Device B 120 (Steps S221 to S225)]

Next, the processing to be performed by the information processing device B 120 (steps S221 to S225) will be described with reference to the flowchart illustrated in FIGS. 15 and 16.

(Step S221)

The processing at step S221 of the flow illustrated in FIG. 15 is to be performed in the input unit 121 of the information processing device B 120 illustrated in FIG. 11.

At step S221, the input unit 121 of the information processing device B 120 inputs data retained in the storage unit of the information processing device B 120, for example, the set: S_j generated from the user-based merchandise-purchase history data illustrated in FIG. 10B.

The set: S_j is a one-piece-of-merchandise-based set including, as an element, the user ID (t=1 to n) having purchased one piece of merchandise j provided by the company 2 retaining the information processing device B 120, and is expressed in (Expression 14) below.

[Math. 14]

$$S_j = \{s_1^j, \ldots, s_{w_j}^j\} \qquad \text{(Expression 14)}$$

Note that, $$(1 \leq i \leq m), s_i^j \in \{1, 2, \ldots, n\}$$

$$w_j = \Sigma_{t=1}^n y_t^j$$

(Step S222)

The processing at step S222 of the flow illustrated in FIG. 15 is to be performed in the random permutation unit 125 and the hash computation unit 123 of the information processing device B 120 illustrated in FIG. 11.

At step S222, the random permutation unit 125 of the information processing device B 120 performs random permutation to the input value: S_j at step S221, and outputs random-permutated data to the hash computation unit 123.

The hash computation unit 123 calculates a hash value for the random-permutated data of the input value: S_j generated in the random permutation unit 125.

Specific computation is performed in accordance with (Expression 15a) and (Expression 15b) below.

[Math. 15]

$$\{\hat{s}_1^j, \ldots, \hat{s}_{w_j}^j\} \leftarrow \Pi S_j (1 \leq j \leq m) \qquad \text{(Expression 15a)}$$

$$hs_u^j = H(\hat{s}_u^j)(1 \leq j \leq m, 1 \leq u \leq w_j) \qquad \text{(Expression 15b)}$$

(Expression 15a) above expresses the random permutation processing of the input value: S_j by the random permutation unit 125.

(Expression 15b) expresses the hash value calculation processing of the random permutated data by the hash computation unit 123.

(Step S223)

The processing at step S223 is to be performed in the data transmission/reception unit 126, the random-number generation unit 122, and the arithmetic operation unit 124 of the information processing device B 120 illustrated in FIG. 11.

The data transmission/reception unit 126 receives the following pieces of data generated at steps S212 and S213 being processing steps in the information processing device A: the common information: $X = g^{R_C}$ and the set: $\{a\_1, \ldots, a\_v\}$.

Next, the random-number generation unit 122 generates random numbers R_S and R'_S, and the arithmetic operation unit 124 computes common information: $Y = g^{R_S}$.

The computation is performed in accordance with (Expression 16) below.

[Math. 16]

$$R_S \leftarrow Z_q,$$

$$R'_S \leftarrow Z_q,$$

$$Y = g^{R_S} \qquad \text{(Expression 16)}$$

(Step S224)

The processing at step S224 is to be performed in the arithmetic operation unit 124 and the random permutation unit 125 of the information processing device B 120 illustrated in FIG. 11.

The arithmetic operation unit 124 exponentiates the input data $\{a\_1, \ldots, a\_v\}$ from the information processing device A 110 by the random number R'_S and outputs exponentiated data thereof to the random permutation unit 125.

The random permutation unit 125 performs random permutation processing to the exponentiated data input.

Specifically, processing based on (Expression 17a) and (Expression 17b) below is performed.

[Math. 17]

$$a'_t = (a_t)^{R'_S}(1 \leq t \leq v) \qquad \text{(Expression 17a)}$$

$$(a'_{1'}, \ldots, a'_{v'}) = \Pi(a'_1, \ldots, a'_v) \qquad \text{(Expression 17b)}$$

(Expression 17a) above expresses the processing of exponentiating the input data $\{a\_1, \ldots, a\_v\}$ by the random number R'_S in the arithmetic operation unit 124.

(Expression 17b) expresses the random permutation processing of the exponentiated data by the random permutation unit 125.

(Step S225)

The processing at step S225 is to be performed in the arithmetic operation unit 124, the hash computation unit 123, and the data transmission/reception unit 126 of the information processing device B 120 illustrated in FIG. 11.

The arithmetic operation unit 124 further exponentiates the hash value of the random permutated input value generated at step S222, by the random number R'_S, and further multiplies the exponentiated hash value by the common information: $X=g^{Rc}$ being the input value from the information processing device A 110, to output a multiplied value to the hash computation unit 123.

The hash computation unit 123 calculates a hash value for the multiplied value.

Specifically, computation based on (Expression 18a) and (Expression 18b) below is performed.

[Math. 18]

$$bs_u^j = X^{R's} \cdot (hs_u^j)^{R's} (1 \le j \le m, 1 \le u \le w_j) \quad \text{(Expression 18a)}$$

$$ts_u^j = H'(bs_u^j)(1 \le j \le m, 1 \le u \le w_j) \quad \text{(Expression 18b)}$$

(Expression 18a) above expresses the processing of exponentiating the hash value of the random permutated input value by the random number R'_S and the processing of multiplying the exponentiated hash value by the common information: $X=g^{Rc}$, in the arithmetic operation unit 124.

(Expression 18b) expresses the hash value calculation processing to the multiplied value by the hash computation unit 123.

The data transmission/reception unit 126 of the information processing device B 120 transmits the common information $Y=g^{Rs}$ generated at step S223 and additionally the data generated at steps S224 and S225, to the information processing device A 110.

The data to be transmitted from the information processing device B 120 to the information processing device A 110 includes pieces of data expressed in (Expression 19) below.

[Math. 19]

$$Y=g^{RS}$$

$$\{a'_{l_1}, \ldots, a'_{l_v}\},$$

$$\{ts_1^j, \ldots, ts_{w_j}^j\}(1 \le j \le m) \quad \text{(Expression 19)}$$

[5-3. (Description 3) Processing to be Performed by Information Processing Device A 110 (Steps S214 to S216)]

Next, the processing to be performed by the information processing device A 110 (steps S214 to S216) will be described with reference to the flowchart illustrated in FIG. 16.

The processing at steps S212 and S213 to be performed by the information processing device A 110 and the processing at steps S222 to S225 to be performed by the information processing device B 120 in the processing described above are to be performed as processing of converting the respective pieces of secure data retained by the information processing devices A and B.

Specifically, the secure data is converted by processing such as encryption of vector constituent elements, hash calculation, and random permutation, in order to prevent the secure data from leaking out.

The processing at steps S241 and S215 to be described below includes correlation determination processing between the vectors to be performed with the converted secure data.

(Step S214)

The processing at step S214 is to be performed by the data transmission/reception unit 116, the arithmetic operation unit 114, and the hash computation unit 113 of the information processing device A 110.

The data transmission/reception unit 116 of the information processing device A 110 receives the pieces of data, such as the common information: $Y=g^{Rs}$, expressed in (Expression 19) above, from the information processing device B 120.

The arithmetic operation unit 114 of the information processing device A 110 exponentiates the input data from the information processing device B 120, by the reciprocal of the random number R'_c, and further multiplies the exponentiated input data by $Y^{Rc}$, to output a computed result thereof to the hash computation unit 113.

The hash computation unit 113 calculates a hash value for the input from the arithmetic operation unit 114.

Specifically, computation based on (Expression 20a) and (Expression 20b) below is performed.

[Math. 20]

$$bc_t = Y^{Rc} \cdot (a'_{\ell_t})^{\frac{1}{R'_c} \bmod q} \quad (1 \le t \le v) \quad \text{(Expression 20a)}$$

$$tc_t = H'(bc_t) \ (1 \le t \le v) \quad \text{(Expression 20b)}$$

(Expression 20a) above expresses the computation processing in the arithmetic operation unit 114, and (Expression 20b) expresses the hash value calculation processing by the hash computation unit 113.

(Step S215)

The processing at step S215 is to be performed by the element comparison unit 115 of the information processing device A 110.

The element comparison unit 115 of the information processing device A 110 computes the number of common elements between one piece of merchandise i (i=1 to k) provided by the company 1 retaining the information processing device A 110 and each of the m pieces of merchandise j (j=1 to m) provided by the company 2 retaining the information processing device B 120.

Specifically, for example, the element comparison unit 115 of the information processing device A 110 computes the number of users (number of elements) having purchased, in common, one piece of merchandise i provided by the company 1 and each of the m pieces of merchandise j provided by the company 2.

The processing of computing the number of common elements is based on (Expression 21) below.

[Math. 21]

$$n_j = |\{ts_1^j, \ldots, ts_{w_j}^j\} \cap \{tc_1, \ldots, tc_v\}| \quad \text{(Expression 21)}$$

Note that, $$1 \le j \le m$$

Calculation of the number of common elements based on (Expression 21) above, is performed.

Comparison for the number of common elements based on (Expression 21) is performed to each of the m pieces of merchandise j (j=1 to m) provided by the company 2 retaining the information processing device B 120.

The processing allows m pieces of data of the number of common elements, namely, n_j, note that (j=1 to m), to be sequentially acquired for the m pieces of merchandise j (j=1 to m) provided by the company 2 to the one piece of merchandise i provided by the company 1 retaining the information processing device A 110.

The data transmission/reception unit 116 of the information processing device A 110 transmits the m pieces of data of the number of common elements: n_j to the information processing device B 120.

(Step S216)

The processing at step S216 is to be performed by the output unit 117 of the information processing device A 110.

The output unit 117 of the information processing device A 110 outputs the m pieces of data of the number of common elements: n_j calculated at step S215, to the data processing unit of the information processing device A 110.

The data processing unit of the information processing device A 110 can determine the user-purchase correlation between the pieces of merchandise, with the m pieces of data of the number of common elements: n_j input.

That is, the number of common purchase users having purchased the one piece of merchandise i provided by the company 1 retaining the information processing device A 110 can be checked for each of the m pieces of merchandise j (j=1 to m) provided by the company 2 retaining the information processing device B 120. When the number of common purchase users is large, it can be determined that the merchandise-purchase user correlation is high.

Note that the number of common elements calculated in accordance with (Expression 21) above is equivalent to the inner product of the purchase vectors in (Expression 2a) described earlier.

In addition, the inner product and the Jaccard similarity coefficient have the relationship between (Expression 2a) and (Expression 2) described earlier, and thus the Jaccard similarity coefficient can be calculated with the inner product calculated.

[5-4. (Description 4) Processing to be Performed by Information Processing Device B 120 Illustrated in FIG. 16 (Step S226)]

Finally, the processing to be performed by the information processing device B 120 (step S226) will be described with reference to the flowchart illustrated in FIG. 16.

(Step S226)

The processing at step S226 is to be performed by the data transmission/reception unit 126 and the output unit 127 of the information processing device B 120.

The data transmission/reception unit 126 of the information processing device B 120 receives the m pieces of data of the number of common elements: n_j calculated at step S215 performed by the information processing device A 110, from the information processing device A 110, and then provides the output unit 127 with the m pieces of data of the number of common elements: n_j.

The output unit 127 of the information processing device B 120 outputs the m pieces of data of the number of common elements: n_j to the data processing unit of the information processing device B 120.

The data processing unit of the information processing device B 120 can determine the user-purchase correlation between the pieces of merchandise with the m pieces of data of the number of common elements: n_j input.

That is, the number of common purchase users having purchased the one piece of merchandise i provided by the company 1 retaining the information processing device A 110 can be checked for each of the m pieces of merchandise j (j=1 to m) provided by the company 2 retaining the information processing device B 120. When the number of common purchase users is large, it can be determined that the merchandise-purchase user correlation is high.

In this manner, the processing based on a one-time processing sequence based on the flowchart described with reference to FIGS. 15 and 16, in the processing according to the present disclosure enables the m pieces of data of the number of common elements, namely, n_j, note that (j=1 to m), to be sequentially acquired for the m pieces of merchandise j (j=1 to m) provided by the company 2 to the one piece of merchandise i provided by the company 1 retaining the information processing device A 110.

n_j

A summary of the processing described with reference to FIGS. 15 and 16 is as follows.

The information processing device A 110 has the k number of vectors including the secure data as an element.

Meanwhile, the information processing device B 120 includes a second information processing device having the m number of vectors including the secure data as an element.

The information processing device A 110 receives vector information regarding a vector Y selected from the m number of vectors, as encrypted data, from the information processing device B 120.

The data processing unit of the information processing device A 110 calculates the number of element-based sample identifiers each having a specific common value, namely, (1), from one vector X selected from the k number of vectors retained by the information processing device A 110 and the vector Y received from the information processing device B 120, in accordance with the secure computation, and then performs processing of determining the correlation between the vectors, corresponding to the number calculated.

In the processing, the data processing unit of the information processing device A 110 sequentially calculates the element-based sample identifiers each having the specific common value, for each of a plurality of different vectors Y selected from the m number of vectors to the one vector X, and sequentially determines the correlation between the one vector X and each of the plurality of different vectors.

The processing enables the m pieces of data of the number of common elements, namely, n_j, note that (j=1 to m), to be sequentially acquired for the m pieces of merchandise j (j=1 to m) provided by the company 2 to the one piece of merchandise i provided by the company 1 retaining the information processing device A 110.

[6. Exemplary Hardware Configuration of Information Processing Device]

Finally, an exemplary hardware configuration of an information processing device that performs the processing according to the embodiment will be described with reference to FIG. 18.

Figure 18:
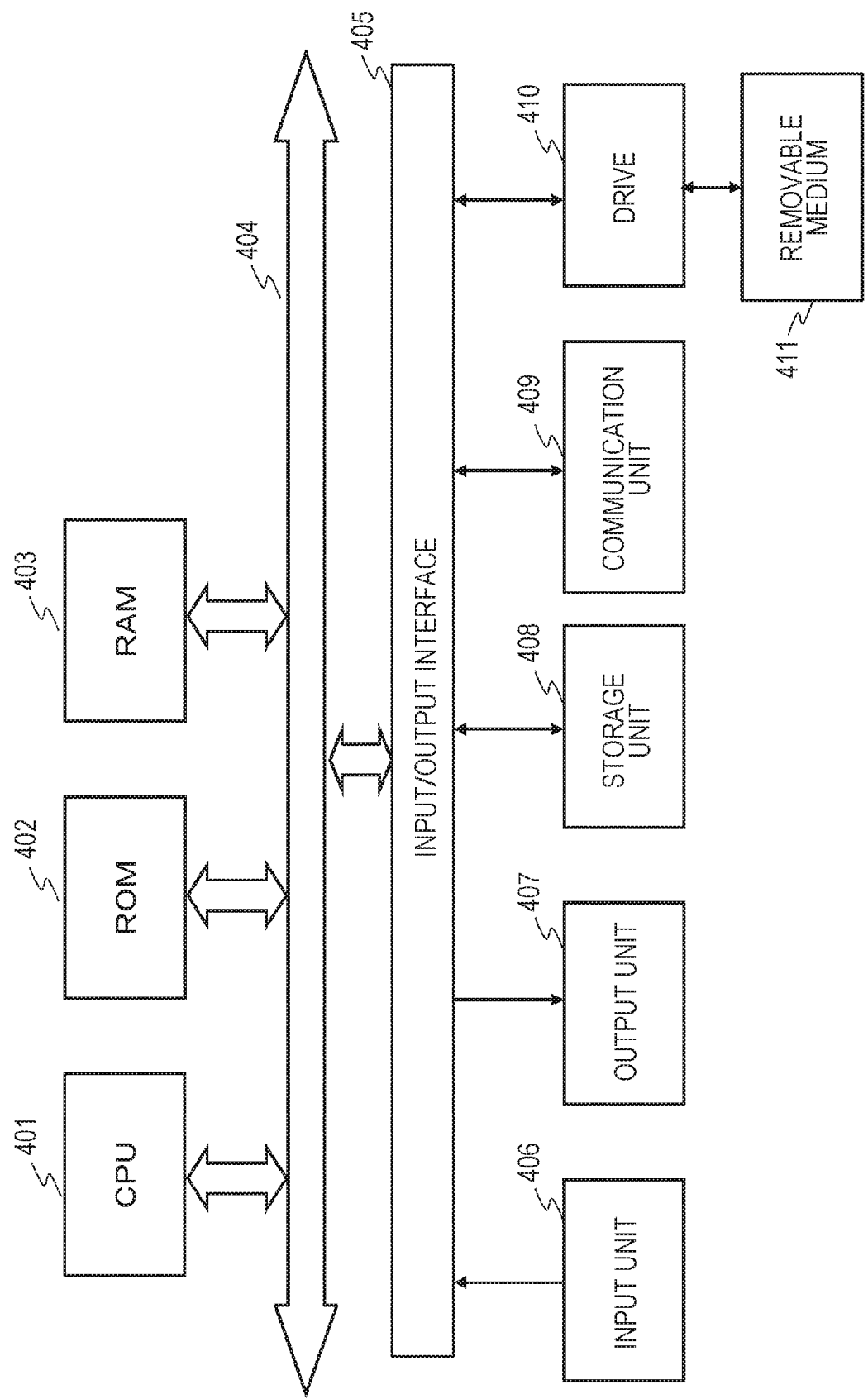
FIG. 18 is a diagram of an exemplary hardware configuration of an information processing device.

FIG. 18 is a diagram of the exemplary hardware configuration of the information processing device.

A central processing unit (CPU) 401 functions as a control unit or a data processing unit that performs various types of processing in accordance with a program stored in a read only memory (ROM) 402 or a storage unit 408. For example, the CPU 401 performs the processing based on the sequence described in the embodiment. A random access memory (RAM) 403 stores, for example, the program to be performed by the CPU 401 and data. The CPU 401, the ROM 402, and the RAM 403 are mutually connected through a bus 404.

The CPU 401 is connected to an input/output interface 405 through the bus 404, and the input/output interface 405 is connected with an input unit 406 including various switches, a keyboard, a mouse, a microphone, and the like, and an output unit 407 including a display, a speaker, and the like. The CPU 401 performs the various types of processing in response to a command input from the input unit 406 to output a processing result to, for example, the output unit 407.

The storage unit 408 connected to the input/output interface 405 includes, for example, a hard disk, and stores the program to be performed by the CPU 401 and various types of data. A communication unit 409 functions as a transmission/reception unit for data communication through a network, such as the Internet or a local area network, and communicates with an external device.

A drive 410 connected to the input/output interface 405 drives a removable medium 411 including a magnetic disk, an optical disc, a magneto-optical disc, or a semiconductor memory, such as a memory card and the like to perform recording or reading of data.

[7. Summary of Configuration of Present Disclosure]

The embodiment of the present disclosure has been described in detail above with reference to the specific embodiment. However, it is obvious that a person skilled in the art may make alterations or replacements to the embodiment without departing from the scope of the spirit of the present disclosure. That is, the present invention has been disclosed in an exemplified mode, and thus the present invention should not be interpreted in a limited way. The scope of the claims should be considered in order to judge the spirit of the present disclosure.

Note that the technology disclosed in the present specification can have the following configurations.

(1) An information processing device including:

a data processing unit configured to determine a correlation between one vector X selected from k number of vectors and one vector Y selected from m number of vectors, in which the data processing unit calculates the number of element-based sample identifiers each having a specific common value, from the vector X and the vector Y, in accordance with secure computation, and performs processing of determining the correlation between the vectors, corresponding to the number calculated, and the data processing unit sequentially calculates the element-based sample identifiers each having the specific common value for each of a plurality of the different vectors Y selected from the m number of vectors to the one vector X, and sequentially determines the correlation between the one vector X and each of the plurality of the different vectors.

(2) The information processing device described in (1), in which the vector X is one vector selected from the k number of vectors each having n number of elements each having a sample-based element value including binary data of 1 or 0, the vector Y is one vector selected from the m number of vectors each having n number of elements each having a sample-based element value including binary data of 1 or 0, the data processing unit performs processing of extracting the number of common sample identifiers from the element-based sample identifiers each having 1 in value in the elements of the vector X and the element-based sample identifiers each having 1 in value in the elements of the vector Y as processing of calculating an inner product between the elements of the vector X and the elements of the vector Y, and the data processing unit performs processing of sequentially extracting the common element-based sample identifiers each having 1 in value for each of the plurality of the vectors Y selected from the m number of vectors to the one vector X.

(3) The information processing device described in (1) or (2), in which the data processing unit receives vector information regarding either the vector X or the vector Y, as encrypted data, from a different information processing device, and performs data processing.

(4) The information processing device described in any of (1) to (3), in which the data processing unit performs computation processing with converted data of the element-based sample identifiers of at least one of the vector X and the vector Y as the secure computation.

(5) The information processing device described in any of (1) to (4), in which the data processing unit performs computation processing with random-permutated data of the element-based sample identifiers of at least one of the vector X and the vector Y as the secure computation.

(6) The information processing device described in any of (1) to (5), in which the data processing unit calculates the number of common sample identifiers from the element-based sample identifiers each having 1 in value in elements of the vector X and the element-based sample identifiers each having 1 in value in elements of the vector Y, and determines, with the number calculated as an inner product value between the elements of the vector X and the elements of the vector Y, that the correlation between the vector X and the vector Y is higher, as the inner product value is larger.

(7) The information processing device described in (6), in which the data processing unit calculates a Jaccard similarity coefficient with application of the inner product value, and determines that the correlation between the vector X and the vector Y is higher, as the Jaccard similarity coefficient is larger in value.

(8) An information processing system including:

a first information processing device having k number of vectors including secure data as an element; and a second information processing device having m number of vectors including secure data as an element, in which the first information processing device receives vector information regarding a vector Y selected from the m number of vectors, as encrypted data, from the second information processing device, a data processing unit of the first information processing device calculates the number of element-based sample identifiers each having a specific common value, from one vector X selected from the k number of vectors retained by the first information processing device and the vector Y, in accordance with secure computation, and performs processing of determining a correlation between the vectors, corresponding to the number calculated, and the data processing unit sequentially calculates the element-based sample identifiers each having the specific common value for each of a plurality of the different vectors Y selected from the m number of vectors to the one vector X, and sequentially determines the correlation between the one vector X and each of the plurality of the different vectors.

(9) The information processing system described in (8), in which the vector X is one vector selected from the k number of vectors each having n number of elements each having a sample-based element value including binary data of 1 or 0, the vector Y is one vector selected from the m number of vectors each having n number of elements each having a sample-based element value including binary data of 1 or 0, the data processing unit performs processing of extracting the number of common sample identifiers from the element-based sample identifiers each having 1 in value in the elements of the vector X and the element-based sample identifiers each having 1 in value in the elements of the vector Y as processing of calculating an inner product between the elements of the vector X and the elements of the vector Y, and the data processing unit performs processing of sequentially extracting the common element-based sample identifiers each having 1 in value for each of the plurality of the vectors Y selected from the m number of vectors to the one vector X.

(10) The information processing system described in (8) or (9), in which the data processing unit performs computation processing with converted data of the element-based sample identifiers of at least one of the vector X and the vector Y as the secure computation.

(11) The information processing system described in any of (8) to (10), in which the data processing unit performs computation processing with random-permutated data of the element-based sample identifiers of at least one of the vector X and the vector Y as the secure computation.

(12) The information processing system described in any of (8) to (11), in which the data processing unit calculates the number of common sample identifiers from the element-based sample identifiers each having 1 in value in elements of the vector X and the element-based sample identifiers each having 1 in value in elements of the vector Y, and determines, with the number calculated as an inner product value between the elements of the vector X and the elements of the vector Y, that the correlation between the vector X and the vector Y is higher, as the inner product value is larger.

(13) The information processing system described in (12), in which the data processing unit calculates a Jaccard similarity coefficient with application of the inner product value, and determines that the correlation between the vector X and the vector Y is higher, as the Jaccard similarity coefficient is larger in value.

(14) An information processing method to be performed in an information processing device including a data processing unit configured to determine a correlation between one vector X selected from k number of vectors and one vector Y selected from m number of vectors, the information processing method including:

calculating the number of element-based sample identifiers each having a specific common value, from the vector X and the vector Y, in accordance with secure computation and performing processing of determining the correlation between the vectors, corresponding to the number calculated, with the data processing unit; and sequentially calculating the element-based sample identifiers each having the specific common value for each of a plurality of the different vectors Y selected from the m number of vectors to the one vector X and sequentially determining the correlation between the one vector X and each of the plurality of the different vectors, with the data processing unit.

(15) An information processing method to be performed in an information processing system including:

a first information processing device having k number of vectors including secure data as an element; and a second information processing device having m number of vectors including secure data as an element, the information processing method including:

receiving vector information regarding a vector Y selected from the m number of vectors, as encrypted data, from the second information processing device, with the first information processing device;

calculating the number of element-based sample identifiers each having a specific common value, from one vector X selected from the k number of vectors retained by the first information processing device and the vector Y, in accordance with secure computation and performing processing of determining a correlation between the vectors, corresponding to the number calculated, with a data processing unit of the first information processing device; and sequentially calculating the element-based sample identifiers each having the specific common value for each of a plurality of the different vectors Y selected from the m number of vectors to the one vector X and sequentially determining the correlation between the one vector X and each of the plurality of the different vectors, with the data processing unit.

(16) A program for causing information processing to be performed in an information processing device including a data processing unit configured to determine a correlation between one vector X selected from k number of vectors and one vector Y selected from m number of vectors, the program causing the data processing unit to execute:

calculating the number of element-based sample identifiers each having a specific common value, from the vector X and the vector Y, in accordance with secure computation and performing processing of determining the correlation between the vectors, corresponding to the number calculated; and further sequentially calculating the element-based sample identifiers each having the specific common value for each of a plurality of the different vectors Y selected from the m number of vectors to the one vector X and sequentially determining the correlation between the one vector X and each of the plurality of the different vectors.

In addition, the set of processing described in the present specification can be performed by hardware, software, or a combined configuration of the two. In a case where the processing is performed by the software, a program including a processing sequence recorded is installed into a memory in a computer built in dedicated hardware or the program is installed into a general-purpose computer capable of performing various types of processing, so that the processing can be performed. For example, the program can be previously recorded in a recording medium. In addition to installation from the recording medium into a computer, the program received through a network, such as a local area network (LAN) or the Internet, can be installed into a built-in recording medium, such as a hard disk.

Note that the various types of processing described in the specification may be performed in parallel or individually in response to the throughput of a device that performs the processing or as necessary, in addition to being performed on a time series basis in accordance with the description. In addition, a system in the present specification is a logical aggregate configuration including a plurality of devices, but is not limited to a configuration including the constituent devices in the same housing.

INDUSTRIAL APPLICABILITY

As described above, the configuration according to one embodiment of the present disclosure allows high-speed and efficient processing of determining the correlation between vectors, to be achieved.

Specifically, an information processing system includes: a first information processing device having k number of vectors including secure data as an element; and a second information processing device having m number of vectors including secure data as an element. The first information processing device receives vector information regarding a vector Y selected from the m number of vectors, as encrypted data, from the second information processing device. A data processing unit of the first information processing device sequentially calculates element-based sample identifiers each having a specific common value for each of a plurality of different vectors Y selected from the m number of vectors to one vector X selected from the k number of vectors retained by the first information processing device, and sequentially determines the correlation between the one vector X and each of the plurality of different vectors.

According to the present configuration, the high-speed and efficient processing of determining the correlation between vectors is achieved.

REFERENCE SINGS LIST

110 Information processing device A
111 Input unit
112 Random-number generation unit
113 Hash computation unit
114 Arithmetic operation unit
115 Element comparison unit
116 Data transmission/reception
117 Output unit
120 Information processing device B
121 Input unit
122 Random-number generation unit
123 Hash computation unit
124 Arithmetic operation unit
125 Random permutation unit
126 Data transmission/reception unit
127 Output unit
401 CPU
402 ROM
403 RAM
404 Bus
405 Input/output interface
406 Input unit
407 Output unit
408 Storage unit
409 Communication unit
410 Drive
411 Removable medium

The invention claimed is:

1. A first information processing device, comprising:
a data processing unit configured to:
determine a correlation between a vector X and a vector Y, wherein
the vector X is a vector selected from k number of a first plurality of vectors,
each of the k number of the first plurality of vectors has n number of elements,
each of the n number of the elements has a sample-based element value including binary data of 1 or 0,
the vector Y is a vector selected from m number of a second plurality of vectors,
each of the m number of the second plurality of vectors has the n number of the elements, and
each of the n number of the elements has the sample-based element value including the binary data of 1 or 0;
calculate a number of element-based sample identifiers each having a specific common value, from the vector X and the vector Y, wherein the number of the element-based sample identifiers is calculated based on a secure computation;
determine the correlation between the vector X and the vector Y corresponding to the calculated number;
sequentially calculate the element-based sample identifiers each having the specific common value for each of the second plurality of vectors selected from the m number of the second plurality of vectors to the vector X;
sequentially determine the correlation between the vector X and each of the second plurality of vectors;
extract a number of common sample identifiers from the element-based sample identifiers each having 1 in value in the elements of the vector X and from the element-based sample identifiers each having 1 in value in the elements of the vector Y;
calculate an inner product value between the elements of the vector X and the elements of the vector Y based on the extraction; and
sequentially extract common element-based sample identifiers each having 1 in value for each of the second plurality of the vectors selected from the m number of the second plurality of vectors to the vector X.

2. The first information processing device according to claim 1, wherein the data processing unit is further configured to receive vector information regarding one of the vector X or the vector Y, as encrypted data, from a second information processing device.

3. The first information processing device according to claim 1, wherein the data processing unit is further configured to perform a computation process based on converted data of the element-based sample identifiers of at least one of the vector X or the vector Y, as the secure computation.

4. The first information processing device according to claim 1, wherein the data processing unit is further configured to perform a computation process based on random-permutated data of the element-based sample identifiers of at least one of the vector X or the vector Y, as the secure computation.

5. The first information processing device according to claim 1, wherein the data processing unit is further configured to:
calculate the number of common sample identifiers from the element-based sample identifiers each having 1 in the value in the elements of the vector X and from the element-based sample identifiers each having 1 in value in the elements of the vector Y; and
determine that the correlation between the vector X and the vector Y is high, based on the inner product value that is large.

6. The first information processing device according to claim 5, wherein the data processing unit is further configured to:
calculate a Jaccard similarity coefficient with application of the inner product value; and
determine that the correlation between the vector X and the vector Y is high, based on the Jaccard similarity coefficient that is large in value.

7. An information processing system, comprising:
a first information processing device having k number of a first plurality of vectors including secure data as an element; and
a second information processing device having m number of a second plurality of vectors including secure data as an element, wherein
the first information processing device is configured to receive vector information regarding a vector Y selected from the m number of the second plurality of vectors, as encrypted data, from the second information processing device, wherein
each of the m number of the second plurality of vectors has n number of elements, and
each of the n number of the elements has a sample-based element value including binary data of 1 or 0,
a data processing unit of the first information processing device is configured to:
calculate a number of element-based sample identifiers each having a specific common value, from a vector X and the vector Y, wherein
the number of the element-based sample identifiers is calculated based on a secure computation,
the vector X is selected from the k number of the first plurality of vectors of the first information processing device,
each of the k number of the first plurality of vectors has the n number of the elements, and
each of the n number of the elements has the sample-based element value including the binary data of 1 or 0;
determine a correlation between the vector X and the vector Y corresponding to the calculated number;
sequentially calculate the element-based sample identifiers each having the specific common value for each of the second plurality of vectors selected from the m number of the second plurality of vectors to the vector X;
sequentially determine the correlation between the vector X and each of the second plurality of vectors;
extract a number of common sample identifiers from the element-based sample identifiers each having 1 in value in the elements of the vector X and from the element-based sample identifiers each having 1 in value in the elements of the vector Y;
calculate an inner product value between the elements of the vector X and the elements of the vector Y based on the extraction; and
sequentially extract common element-based sample identifiers each having 1 in value for each of the second plurality of the vectors selected from the m number of the second plurality of vectors to the vector X.

8. The information processing system according to claim 7, wherein the data processing unit is further configured to perform a computation process based on converted data of the element-based sample identifiers of at least one of the vector X or the vector Y, as the secure computation.

9. The information processing system according to claim 7, wherein the data processing unit is further configured to perform a computation process based on random-permutated data of the element-based sample identifiers of at least one of the vector X or the vector Y, as the secure computation.

10. The information processing system according to claim 7, wherein the data processing unit is further configured to:
calculate the number of common sample identifiers from the element-based sample identifiers each having 1 in the value in the elements of the vector X and from the element-based sample identifiers each having 1 in value in the elements of the vector Y; and
determine that the correlation between the vector X and the vector Y is high, based on the inner product value that is large.

11. The information processing system according to claim 10, wherein the data processing unit is further configured to:
calculate a Jaccard similarity coefficient with application of the inner product value; and
determine that the correlation between the vector X and the vector Y is high, based on the Jaccard similarity coefficient that is large in value.

12. An information processing method executed by an information processing device, the information processing method including:
determining a correlation between a vector X a vector Y, wherein
the vector X is a vector selected from k number of a first plurality of vectors,
each of the k number of the first plurality of vectors has n number of elements,
each of the n number of the elements has a sample-based element value including binary data of 1 or 0,
the vector Y is a vector selected from m number of a second plurality of vectors,
each of the m number of the second plurality of vectors has the n number of the elements, and
each of the n number of the elements has the sample-based element value including the binary data of 1 or 0;
calculating a number of element-based sample identifiers each having a specific common value, from the vector X and the vector Y, wherein the number of the element-based sample identifiers is calculated based on a secure computation;
determining the correlation between the vector X and the vector Y corresponding to the calculated number;
sequentially calculating the element-based sample identifiers each having the specific common value for each of the second plurality of vectors selected from the m number of the second plurality of vectors to the vector X;
sequentially determining the correlation between the vector X and each of the second plurality of vectors;
extracting a number of common sample identifiers from the element-based sample identifiers each having 1 in value in the elements of the vector X and from the element-based sample identifiers each having 1 in value in the elements of the vector Y;
calculating an inner product value between the elements of the vector X and the elements of the vector Y based on the extraction; and
sequentially extracting common element-based sample identifiers each having 1 in value for each of the second plurality of the vectors selected from the m number of the second plurality of vectors to the vector X.

13. An information processing method executed in an information processing system including a first information processing device and a second information processing device, the information processing method comprising:
receiving, by the first information processing device, vector information regarding a vector Y selected from m number of a second plurality of vectors, as encrypted data, from the second information processing device, wherein
the second information processing device has the m number of the second plurality of vectors including secure data as an element,
each of the m number of the second plurality of vectors has n number of elements, and
each of the n number of the elements has a sample-based element value including binary data of 1 or 0;
calculating, by a data processing unit of the first information processing device, a number of element-based sample identifiers each having a specific common value, from a vector X and the vector Y, wherein
the number of the element-based sample identifiers is calculated based on a secure computation,
the first information processing device has k number of a first plurality of vectors including secure data as an element,
the vector X is selected from the k number of the first plurality of vectors of the first information processing device, and
each of the k number of the first plurality of vectors has the n number of the elements, and
each of the n number of the elements has the sample-based element value including the binary data of 1 or 0;
determining, by the data processing unit of the first information processing device, a correlation between the vector X and the vector Y, corresponding to the calculated number;
sequentially calculating, by the data processing unit of the first information processing device, the element-based sample identifiers each having the specific common value for each of the second plurality of vectors selected from the m number of the second plurality of vectors to the vector X;
sequentially determining, by the data processing unit of the first information processing device, the correlation between the vector X and each of the second plurality of vectors;
extracting, by the data processing unit of the first information processing device, a number of common sample identifiers from the element-based sample identifiers each having 1 in value in the elements of the vector X and from the element-based sample identifiers each having 1 in value in the elements of the vector Y;
calculating, by the data processing unit of the first information processing device, an inner product value between the elements of the vector X and the elements of the vector Y based on the extraction; and
sequentially extracting, by the data processing unit of the first information processing device, common element-based sample identifiers each having 1 in value for each of the second plurality of the vectors selected from the m number of the second plurality of vectors to the vector X.

14. A non-transitory computer-readable medium having stored thereon, computer-executable instructions which when executed by an information processing apparatus cause the information processing apparatus to execute operations, the operations comprising:
determining a correlation between a vector X and a vector Y, wherein
the vector X is a vector selected from k number of a first plurality of vectors,
each of the k number of the first plurality of vectors has n number of elements,
each of the n number of the elements has a sample-based element value including binary data of 1 or 0,
the vector Y is a vector selected from m number of a second plurality of vectors,
each of the m number of the second plurality of vectors has the n number of the elements, and
each of the n number of the elements has the sample-based element value including the binary data of 1 or 0;
calculating a number of element-based sample identifiers each having a specific common value, from the vector X and the vector Y, wherein the number of the element-based sample identifiers is calculated based on a secure computation;
determining the correlation between the vector X and the vector Y corresponding to the calculated number;
sequentially calculating the element-based sample identifiers each having the specific common value for each of the second plurality of vectors selected from the m number of the second plurality of vectors to the vector X;
sequentially determining the correlation between the vector X and each of the second plurality of vectors;
extracting a number of common sample identifiers from the element-based sample identifiers each having 1 in value in the elements of the vector X and from the element-based sample identifiers each having 1 in value in the elements of the vector Y;
calculating an inner product value between the elements of the vector X and the elements of the vector Y based on the extraction; and
sequentially extracting common element-based sample identifiers each having 1 in value for each of the second plurality of the vectors selected from the m number of the second plurality of vectors to the vector X.

* * * * *